(12) United States Patent
Seri et al.

(10) Patent No.: US 8,487,992 B2
(45) Date of Patent: Jul. 16, 2013

(54) IMAGE PROCESSING DEVICE AND IMAGE PROCESSING METHOD

(75) Inventors: Akinobu Seri, Osaka (JP); Hidetoshi Morimoto, Osaka (JP)

(73) Assignee: Keyence Corporation, Osaka (JP)

( * ) Notice: Subject to any disclaimer, the term of this patent is extended or adjusted under 35 U.S.C. 154(b) by 399 days.

(21) Appl. No.: 12/897,820

(22) Filed: Oct. 5, 2010

(65) Prior Publication Data

US 2011/0102617 A1    May 5, 2011

(30) Foreign Application Priority Data

Oct. 30, 2009 (JP) ................. 2009-250169

(51) Int. Cl.
*H04N 7/18* (2006.01)
*H04N 9/47* (2006.01)

(52) U.S. Cl.
USPC .......... 348/133; 348/125; 348/126; 348/128; 348/129; 348/130; 348/135

(58) Field of Classification Search
USPC ............... 348/125, 126, 128–130, 133, 135
See application file for complete search history.

(56) References Cited

U.S. PATENT DOCUMENTS 6,278,447 B1 * 8/2001 Anderson ............... 715/723
2008/0253673 A1 * 10/2008 Nakagawa ............... 382/239

FOREIGN PATENT DOCUMENTS

| JP | 09-288568 | 11/1997 |
| JP | 2006-023838 | 1/2006 |
| JP | 2009-122035 | 6/2009 |

* cited by examiner

*Primary Examiner* — Sath V Perungavoor
*Assistant Examiner* — Geepy Pe
(74) *Attorney, Agent, or Firm* — Kilyk & Bowersox, P.L.L.C.

(57) ABSTRACT

The invention provides an image processing device and an image processing method which can efficiently make use of memory resources, and can also edit and simulate a registered image or the like so as to reflect the registered image or the like after editing in a normal operation without stopping the normal operation, and further to enhance production efficiency. When data for image processing edited in a second processing section is to be reflected in image processing (normal operation) that is continuously executed in a first processing section, the edited data for image processing is transmitted from a third data storage area to a second data storage area, and the edited data for image processing is read from the second data storage area when image processing is executed by use of the edited data for image processing in the first processing section.

7 Claims, 26 Drawing Sheets

FIG. 16

| HISTORY VIEWER | | | |
|---|---|---|---|
| STORAGE CONDITION [0:▽] | | SUSPEND STORAGE | CLEAR DATA INSIDE STORAGE CONDITIONS | CLEAR ALL |
| STORAGE UNIT SINGLE ⟨STORING⟩ | | | |
| SORTING SEQUENCE DESCENDING SEQUENCE ▽ | | | |
| DISPLAYED IMAGE &Cam1Img(CAMERA 1) ▽ | | | |

| | NUMBER OF MEASUREMENT | TIME AND DATE | DETERMINATION |
|---|---|---|---|
| ☐ | 2704 | 10/09 15:27:16 | OK |
| ☐ | 2703 | 10/09 15:27:16 | OK |
| ☐ | 2702 | 10/09 15:27:15 | OK |
| ☐ | 2701 | 10/09 15:27:15 | OK |
| ☐ | 2700 | 10/09 15:27:15 | OK |
| ☐ | 2699 | 10/09 15:27:15 | OK |
| ☐ | 2698 | 10/09 15:27:15 | OK |
| ☐ | 2697 | 10/09 15:27:15 | OK |
| ☐ | 2696 | 10/09 15:27:15 | OK |
| ☐ | 2695 | 10/09 15:27:15 | OK |

NUMBER OF PAGES: 1/1  SELECTED ITEM: 0/10

| SELECT ALL | INVERT SELECTION | UPDATE | REPRODUCE HISTORY | WRITE | CLOSE |

2704 TIMES 10/09 15:27:16
2703 TIMES 10/09 15:27:16
2702 TIMES 10/09 15:27:15
2701 TIMES 10/09 15:27:15

FIG. 17

STATISTICAL ANALYSIS

LIST OF MEASURED VALUES
TREND GRAPH
HISTOGRAM

▷ UNIT/VARIABLE   U0003:PATTERN SEARCHING ▷   HISTORY STORAGE CONDITION   DISPLAYED VALUE  UPOSITION X ▷
  0:  ▷
NUMBER OF PAGES:  1/ 486  CLEAR

| NUMBER OF MEASUREMENT | MEASURED VALUE | HISTORY |
|---|---|---|
| 6306 | 248.251 | * |
| 6307 | 248.238 | * |
| 6306 | 248.241 | * |
| 6305 | 248.256 | * |
| 6304 | 248.249 | * |
| 6303 | 248.243 | * |
| 6302 | 248.252 | * |
| 6301 | 248.248 | * |
| 6300 | 248.242 | * |
| 6299 | 248.236 | * |
| 6298 | 248.248 | * |
| 6297 | 248.245 | * |
| 6296 | 248.241 | * |

1053
1052
1051

SORTING SEQUENCE  NUMBER OF MEASUREMENT DESCENDING SEQUENCE ▷
LOWER LIMIT _____   UPPER LIMIT _____

MEASURED VALUE DETERMINATION RECORD
NUMBER OF EXECUTION                 6309
NUMBER OF EXECUTION OK              6309
NUMBER OF EXECUTION NG                 0
YIELD                           100.000%
NUMBER OF NON-EXECUTION                0

MEASURED VALUE STATISTICAL AMOUNT
MAXIMAL VALUE              248.742
MINIMAL VALUE              248.197
DEVIATION (σ)                0.036
AVERAGE + 3σ               248.359
AVERAGE + σ                248.286
AVERAGE                    248.250
AVERAGE − σ                248.214
AVERAGE − 3σ               248.142

WRITE
CANCEL

LIST OF LOCAL VARIABLES

SCALAR : #L0000
SCALAR : #L0001
SCALAR : #a
SCALAR : #b
SCALAR : #L0002

0000000.000
0000000.000
0000000.000
0000000.000
0000000.000

ADD
DELETE
EDIT
CLOSE

SELECT ALL
INVERT SELECTION

DISPLAY SEQUENCE - ASCENDING SEQUENCE
CURRENT VALUE
59.3%

SORTING
DISPLAYED VALUE
RESOURCE MEMORY

1071

IMAGE PROCESSING DEVICE AND IMAGE PROCESSING METHOD

CROSS-REFERENCE TO RELATED APPLICATIONS

The present application claims foreign priority based on Japanese Patent Application No. 2009-250169, filed Oct. 30, 2009, the contents of which is incorporated herein by reference.

BACKGROUND OF THE INVENTION

1. Field of the Invention

The present invention relates to an image processing device and an image processing method, for imaging an inspection target with a camera, to execute measurement processing by use of the obtained image data.

2. Description of Related Art

In a large number of production sites such as plants, there have been introduced image processing devices which automatize and speed up inspections that have been relied upon visual checkup. The image processing device images, with a camera, a work flowing along a production line such as a belt conveyer, and executes measurement processing such as edge detection and area calculation of a predetermined area by use of the obtained image data. Subsequently, based upon a processing result of the measurement processing, inspections such as chipping detection of the work and positional detection of an alignment mark are performed, and a determination signal for determining the presence or absence of a chip of the work and displacement is outputted. In this manner, the image processing device may be utilized as one of FA sensors.

The image processing devices include a package type image processing device which executes a previously decided sequence of image processing, and an image processing device to which an image processing program for executing a desired processing sequence, created by a user on a personal computer, is transmitted and which then executes measurement processing as desired. The former can execute image processing only in the previously decided processing sequence, thereby to restrict the degree of freedom of image processing, while the latter requires high programming skills and a great number of man-hours for executing the desired measurement processing. As an image processing device for solving these problems, there is an image processing device in which a series of processing sequences of inspection items in image processing is displayed in the form of a flowchart, and the processing sequence is made changeable by the user on the flowchart (e.g. see Japanese Unexamined Patent Publication No. 09-288568). In order for the user to realize a desired processing sequence, for example, a processing sequence is customized on the flowchart by means of dedicated software on a PC, a processing sequence program is created for making the image processing device execute the customized processing sequence, and thereafter the processing sequence program is transmitted to a controller of the image processing device.

According to such an image processing device, a processing sequence of image processing can be customized with a small number of man-hours on the flowchart without the need for high programming skills. Further, although there are cases where the number of inspection items is several tens or several hundreds at the time of intending to perform complex image processing, when a series of processing sequences is displayed in the form of a flowchart, the user can grasp contents of overall image processing at one view, thereby to perform desired customization while overlooking an overall flowchart, and further to enhance the degree of freedom of the image processing. Moreover, by executing each piece of image processing in synchronization with the processing sequence shown in the flowchart, an operation of writing image data obtained by imaging into a memory and an operation of reading image data for executing measurement processing from the memory are not performed in the same timing, and thereby a memory conflict problem can also be prevented. Furthermore, debugging can be performed along the processing sequence, and thereby bug correction can also be facilitated.

In inspection settings with such image processing, first, essential image processing such as imaging and individual image processing required for inspection, such as edge detection and area calculation, are selected as inspection items, which are then arranged into a desired sequence (e.g. in a top-to-bottom sequence), to produce a flowchart showing a processing sequence. In addition, as described above, the processing sequence can be changed on the flowchart by changing the arrangement of the inspection items. Further, for creating and editing the flowchart, a personal computer connected to the image processing device can also be used, and a monitor, a console and the like connected to the image processing device can also be used.

Next, along with a setting of a parameter value to each inspection item, settings of a registered image required for a specific inspection item, such as pattern searching, and the like are performed. Specifically describing, for example, parameter values for designating an imaging-target camera, a shutter speed, and the like are set. Further, in the edge detection and the area calculation, determination conditions for determining the presence or absence of a chip of a work and displacement, and the like are set. Moreover, in pattern searching for specifying, for example, whether or not a specific pattern appears in image data obtained by imaging an inspection target and where the specific pattern is located in the case where the pattern appears, an image as a reference of a specific pattern is previously set as a registered image. After completion of creating and editing a flowchart by selection and arrangement of inspection items, setting optimal parameter values for respective inspection items and setting an optimal registered image as needed, the inspection setting is completed, and according to the created flowchart, a normal operation of the image processing device is started.

Herein, after the inspection setting has once been completed and the normal operation of the image processing device has been started, the same parameter values and registered image are desirably kept being used so as to make maintenance unnecessary. However, there are cases where the parameter value or the registered image is wished to be edited due to a change in image lighting environment caused by aged deterioration in LED for lighting a work or a change in kind of work flowing along the production line. Additionally, there are cases where the appropriateness of the parameter values and the registered image after editing are wished to be verified by performing a simulation by use of the parameter values and the registered image after editing. Since a general image processing device has one processor for executing the foregoing measurement processing such as edge detection and area calculation, when the user is to edit the parameter value or the registered image or perform a simulation by use of the parameter values and the registered image after editing, it has been necessary to temporarily stop the normal operation of the image processing device.

Nevertheless, when the normal operation of the image processing device being used also as the FA sensor is temporarily stopped, a production line also needs to be stopped, bringing about decreased production efficiency. Especially when the normal operation of the image processing device is stopped with intent to edit the registered image, a certain amount of time, such as several seconds or several minutes, is required. Taking a specific example, in the case of an unnecessary portion (noise, etc.) being present as a specific pattern in the registered image, the user first temporarily stops the operation of the image processing device, and sets the unnecessary portion as a mask area (area for sealing an unnecessary portion) with use of a console and a monitor connected to the image processing device, and the user can then edit a more optimal registered image, but this operation requires a certain amount of time. Further, when a simulation is to be further performed using the registered image after editing, it requires further more time.

In this respect, for example as disclosed in Japanese Unexamined Patent Publication No. 08-128960, providing two sets of CPUs and memories may make it possible to edit the registered image and perform a simulation by use of the registered image after editing without stopping the normal operation. Specifically, the normal operation is performed with one CPU and memory, and the registered image is edited and the simulation is performed using the registered image after editing with the other CPU and memory. When the registered image after editing is wished to be used as a result of the simulation, the normal operation is switched so as to be next performed with the other CPU and memory. Subsequently, during the normal operation performed with the other CPU and memory, the registered image is edited and the simulation is performed using the registered image after editing with the one CPU and memory. Alternately performing the normal operation and the simulation with two sets of CPUs and memories in such a manner may make it possible to edit the registered image and perform the simulation by use of the registered image after editing without stopping the normal operation.

However, when the normal operation and the simulation are to be alternately performed with two sets of CPUs and memories (when two sets of CPUs and memories are to be mirrored), two sets of CPUs and memories having the same performance are required. Especially as for the memory, one memory and the other memory need to have an equivalent storage capacity, which results in an increase in heap area that needs to be ensured, making it difficult to efficiently make use of memory resources.

SUMMARY OF THE INVENTION

The present invention has been made in view of the above points, and an object thereof is to provide an image processing device and an image processing method, which can efficiently make use of memory resources, and can also edit and simulate a registered image or the like so as to reflect the registered image or the like after editing in a normal operation without stopping the normal operation, and further to enhance production efficiency.

An image processing device according to the present invention has a camera that images an inspection target to produce image data, stores a processing sequence program defined with a processing sequence of a plurality of pieces of image processing, and sequentially executes the plurality of pieces of image processing by use of image data obtained from the camera based upon the processing sequence program, to determine quality of the inspection target based upon a processing result and output a determination signal, and the image processing device includes: a first processing section which has a first data storage area and a second data storage area for storing data for image processing that is used for at least one image processing among the plurality of pieces of image processing, and executes the plurality of pieces of image processing; a second processing section which has a third data storage area for storing the data for image processing and executes at least one image processing among the plurality of pieces of image processing; a control section which transmits to the first processing section and the second processing section a command instructing image processing to be executed; and an operation input section, into which an operation signal based upon an operation by a user is inputted, wherein, when image processing is executed by use of the data for image processing in the first processing section, the control section transmits to the first processing section a command instructing that the data for image processing be read from the first data storage area, as well as instructing that the plurality of pieces of image processing be continuously executed based upon the processing sequence program, while transmitting to the second processing section, based upon the operation signal, a command instructing that data for image processing stored into the third data storage area be edited, and also transmitting a command instructing that image processing by use of the edited data for image processing be executed, and when the edited data for image processing is to be reflected in image processing that is continuously executed in the first processing section, the edited data for image processing is transmitted from the third data storage area to the second data storage area, and the edited data for image processing is read from the second data storage area when image processing is executed by use of the edited data for image processing in the first processing section.

According to such a configuration, when data for image processing is being read from the first data storage area as needed and a plurality of pieces of image processing are also being executed continuously based upon the processing sequence program (during a normal operation) in the first processing section, the user can edit data for image processing through the second processing section by, for example, operating a console or the like, and execute image processing by use of the edited data for image processing. When the edited data for image processing is to be reflected in image processing that is continuously executed in the first processing section, the edited data for image processing is transmitted from the third data storage area in the second processing section to the second data storage area in the first processing section, and when the image processing is executed by use of the edited data for image processing in the first processing section, the edited data for image processing is read from the second data storage area. It is therefore possible in the second processing section to edit the data for image processing and perform a simulation by use of the data for image processing after editing, and also to reflect the data for image processing after editing in the normal operation, so as to enhance the production efficiency.

Further, in the image processing device according to the present invention, with the first processing section being fixed as a processing section for the normal operation and the second processing section being fixed as a processing section for editing and simulation, a specification of the second processing section is sufficient when being on a lower level than a specification of the first processing section (e.g. a storage capacity of the third data storage area is sufficient when being capable of storing the edited data for image processing).

Consequently, it is not necessary to prepare CPUs and memories with the same performances in the first processing section and the second processing section, and it is thereby possible to efficiently make use of the memory resources.

Herein, when "the edited data for image processing is transmitted from the third data storage area to the second data storage area", a subject that performs the transmission can be any section. For example, a configuration may be employed where the control section reads once edited data for image processing from the third data storage area and stores the data into a predetermined storage area, and thereafter the control section transmits the data to the second data storage area. Further, a configuration may also be employed where the control section reads once edited data for image processing from the third data storage area and stores the data into a predetermined storage area, and thereafter, based upon the command from the control section, the first processing section reads the data and transmits the data to the second data storage area. Moreover, a configuration may also be employed where, based upon the command from the control section, the second processing section reads the data for image processing from the third data storage area, and directly transmits the data to the second data storage area. Furthermore, a configuration may also be employed where, based upon the command from the control section, the first processing section directly reads the data for image processing from the third data storage area, and directly transmits the data to the second data storage area.

Moreover, in the image processing device according to the present invention, the control section has a fourth data storage area for storing the edited data for image processing read from the third data storage area, and when the edited data for image processing is to be reflected in image processing that is continuously executed in the first processing section, the control section reads the edited data for image processing from the third data storage area and stores the data into the fourth data storage area, while transmitting to the first processor a command instructing that the edited data for image processing be read from the fourth data storage area and stored into the second data storage area, and when image processing is executed by use of the edited data for image processing in the first processing section, the control section transmits a command instructing that the edited data for image processing be read from the second data storage area. Accordingly, the data for image processing can be edited and a simulation by use of the image data after editing can be performed in the second processing section without stopping the normal operation in the first processing section, while the data for image processing after editing can be reflected in the normal operation, leading to enhancement of the production efficiency. Especially in transmission of the edited data for image processing from the third data storage area to the second data storage area, the fourth data storage area in the control section is interposed so that, even when the data for image processing has a large volume, the data can once be buffered in the control section, and the first processing section can read data for image processing from the fourth data storage area in desired timing based upon the command from the control section. For example, when the first processing section has a dual-core or the like and thus can read data for image processing in parallel with image processing that is continuously executed therein, the first processing section may do so, or when the first processing section has a single-core or the like and thus has difficulties in reading data for image processing in parallel with image processing that is continuously executed therein, the first processing section may read data for image processing during an interval of image processing that is continuously executed therein.

Moreover, in the image processing device according to the present invention, the first processing section and the second processing section respectively have a first processor and a second processor, and when data for image processing edited by the second processor is to be reflected in image processing that is continuously executed by the first processor during continuous execution of the image processing by the first processor based upon the command from the control section, the control section reads the edited data for image processing from the third data storage area and stores the data into the fourth data storage area, while transmitting to the first processor a command instructing that an interruption be made during execution of image processing or between previous image processing and subsequent image processing, and the edited data for image processing be read from the fourth data storage area and stored into the second data storage area. Accordingly, in the first processing section, the first data storage area can be accessed and image processing is continuously executed while the data for image processing edited during intervals of image processing can be stored into the second data storage area. Especially, even when the first processor is a single-core processor, the edited data for image processing can be stored into the second data storage area during the normal operation.

Moreover, in the image processing device according to the present invention, data for image processing edited by the second processor is image data, and when reading the edited image data from the fourth data storage area, the control section transmits to the first processor a command instructing that the image data be divided into small units and sequentially stored into the second data storage area. Accordingly, even in the case of storing large-volume (two-dimensional) image data or the like, it can be gradually stored into the second data storage area. This can result in reflection of the image data after editing in the normal operation while not stopping the normal operation and hardly decreasing a speed of the normal operation, thereby further enhancing the production efficiency.

Moreover, the image processing device according to the present invention includes a display section which displays image processing results in the first processing section and the second processing section, wherein, when image processing is being continuously executed in the first processing section, the second processing section transmits to the display section a control signal for displaying the image processing result in the first processing section based upon the command from the control section, and edits therein data for image processing stored into the third data storage area, and when image processing by use of the edited data for image processing is executed, the second processing section transmits to the display section a control signal for displaying the image processing result in the second processing section based upon the command from the control section. Accordingly, it is possible to simply switch-display the image processing results in the first processing section and the second processing section based upon an operation by the user. Further, in the second processing section which transmits a control signal to the display section, the data for image processing is edited and image processing by use of the edited data for image processing is executed, whereby it is possible to prevent a decrease in processing ability during the normal operation in the first processing section. Further, generally, the third data storage area in the second processing section which transmits the control signal to the display section is realized by a memory with a small storage capacity, such as a video RAM. Even in such a case, according to the foregoing configuration, the processing of editing the data for image processing in the third data storage area, transmitting the data for image processing after editing to the second data storage area, editing again the data for image processing in the third data storage area, transmitting the data for image processing after editing to the second data storage area, . . . , are repeated, whereby a capacity of the third data storage area can be small even in the case of editing a plurality of pieces of data for image processing (a capacity capable of storing one piece of data for image processing may be sufficient). As thus described, according to the foregoing configuration, even when fixed usage restrictions are imposed on the third data storage area (e.g. even when only a predetermined number of pieces of data for image processing can be stored), it is substantially possible to edit a plurality of (a larger number than the predetermined number of) pieces of data for image processing within the usage restrictions.

Moreover, the image processing device according to the present invention includes a variable value storage area which stores a variable value of a variable referenceable in the processing sequence program, wherein, when the variable value of the variable is changed based upon the operation signal, the control section stores the changed variable value into the variable value storage area, and when transmitting the variable value of the variable to the first processing section along with the command instructing image processing to be executed, the control section transmits the changed variable value as for the variable with the variable value changed based upon the operation signal. Accordingly, a variable not intentionally changeable by the user, such as a count-up variable for a flow period, is not reflected in the normal operation, and only a variable intentionally changed by the user can be reflected in the normal operation.

As described above, according to the present invention, it is possible to edit and simulate data for image processing so as to reflect the data for image processing after editing in the normal operation without stopping the normal operation, and further enhance production efficiency. Moreover, it is possible to efficiently make use of memory resources.

BRIEF DESCRIPTION OF THE DRAWINGS

FIG. 16 is an example of the display screen of the monitor when the processing operation shown in FIG. 8 is being performed;

FIG. 17 is an example of the display screen of the monitor when the processing operation shown in FIG. 8 is being performed;

FIG. 21 is an example of a display screen of the monitor when a variable value of a variable, defined by a user, is being edited;

DESCRIPTION OF THE PREFERRED EMBODIMENTS

Hereinafter, an image processing device according to embodiments of the present invention will be specifically described with reference to the drawings.

[Schematic Configuration]

Figure 1:
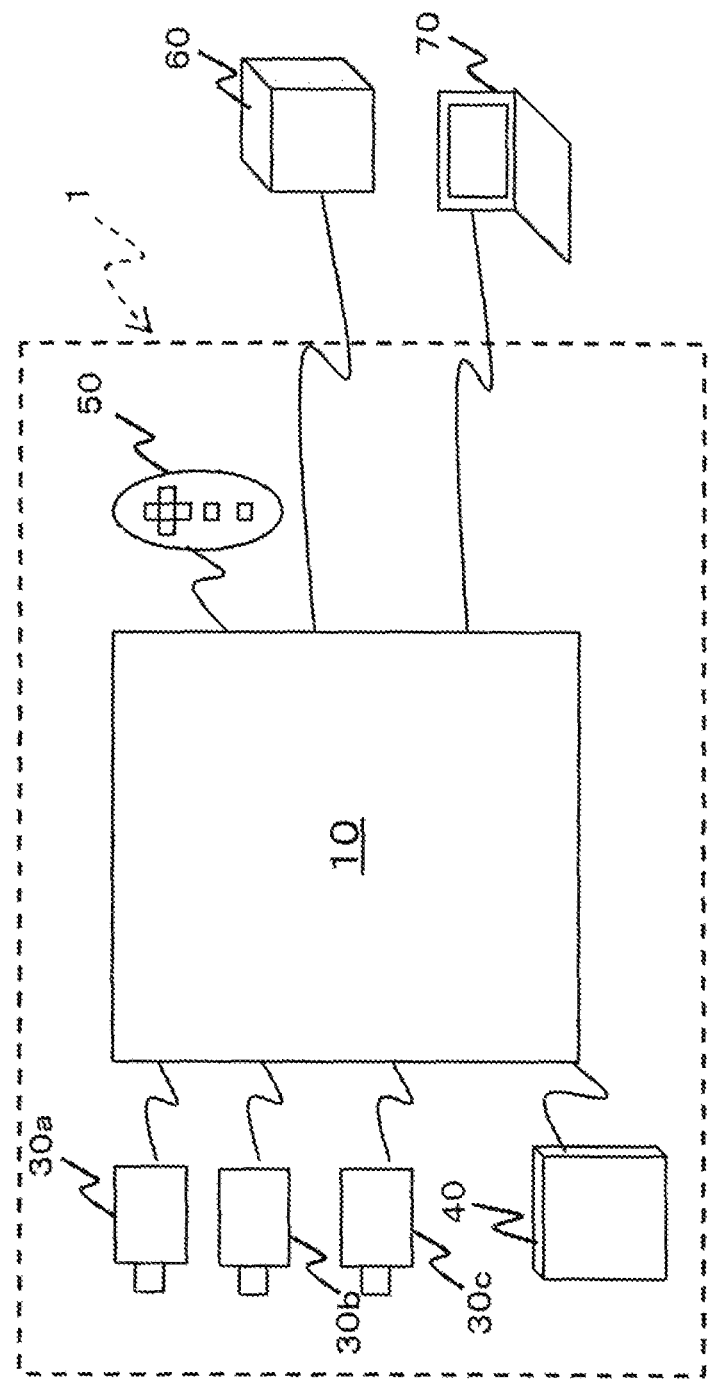
FIG. 1 is a diagram showing an example of a schematic configuration of an image processing device according to an embodiment of the present invention.

FIG. 1 is a diagram showing a schematic configurational example of an image processing device 1 according to an embodiment of the present invention. As shown in FIG. 1, the image processing device 1 has a controller 10 for executing measurement processing such as edge detection and area calculation, three cameras 30a to 30c for imaging an inspection target, a monitor 40 such as a liquid crystal panel, and a console 50 for a user to perform a variety of operations on the monitor 40. The cameras 30a to 30c, the monitor 40 and the console 50 are detachably connected with the controller 10. The controller 10 executes image processing by use of image data obtained from the cameras 30a to 30c, and outputs a determination signal as a signal showing a determination result, such as the quality of a work, to an externally connected PLC (Programmable Logic Controller) 60.

The three cameras 30a to 30c image the inspection target based upon a control signal inputted from the PLC 60, such as an imaging trigger signal that defines timing for capturing image data from the cameras 30a to 30c. The monitor 40 is a display device for displaying image data obtained by imaging the inspection target and a result of measurement processing performed by use of the image data. Generally, by visually checking the monitor 40, the user can check an operating state of the controller 10 in the case of the image processing device 1 in a normal operation. The console 50 is an input device for moving a focal position or selecting a menu item on the monitor 40. Especially, as described later, the console 50 serves as an input device for editing a registered image in the present embodiment.

Further, the controller 10 of the image processing device 1 is connected with a PC 70 for producing a control program of the image processing device 1, and a processing sequence program for defining a processing sequence of image processing units is produced by software operated on the PC 70. In the image processing device 1, each image processing unit is sequentially executed in accordance with the processing sequence. The PC 70 and the controller 10 are connected with each other through a communication network, and the processing sequence program produced on the PC 70 is transmitted to the controller 10 together with layout information that defines a display mode of the monitor 40, and the like. On the contrary, the processing sequence program, the layout information and the like can be captured from the controller 10, and edited on the PC 70. It is to be noted that this processing sequence program can also be produced in the controller 10, as well as on the PC 70.

[Hardware Configuration]

Figure 2:
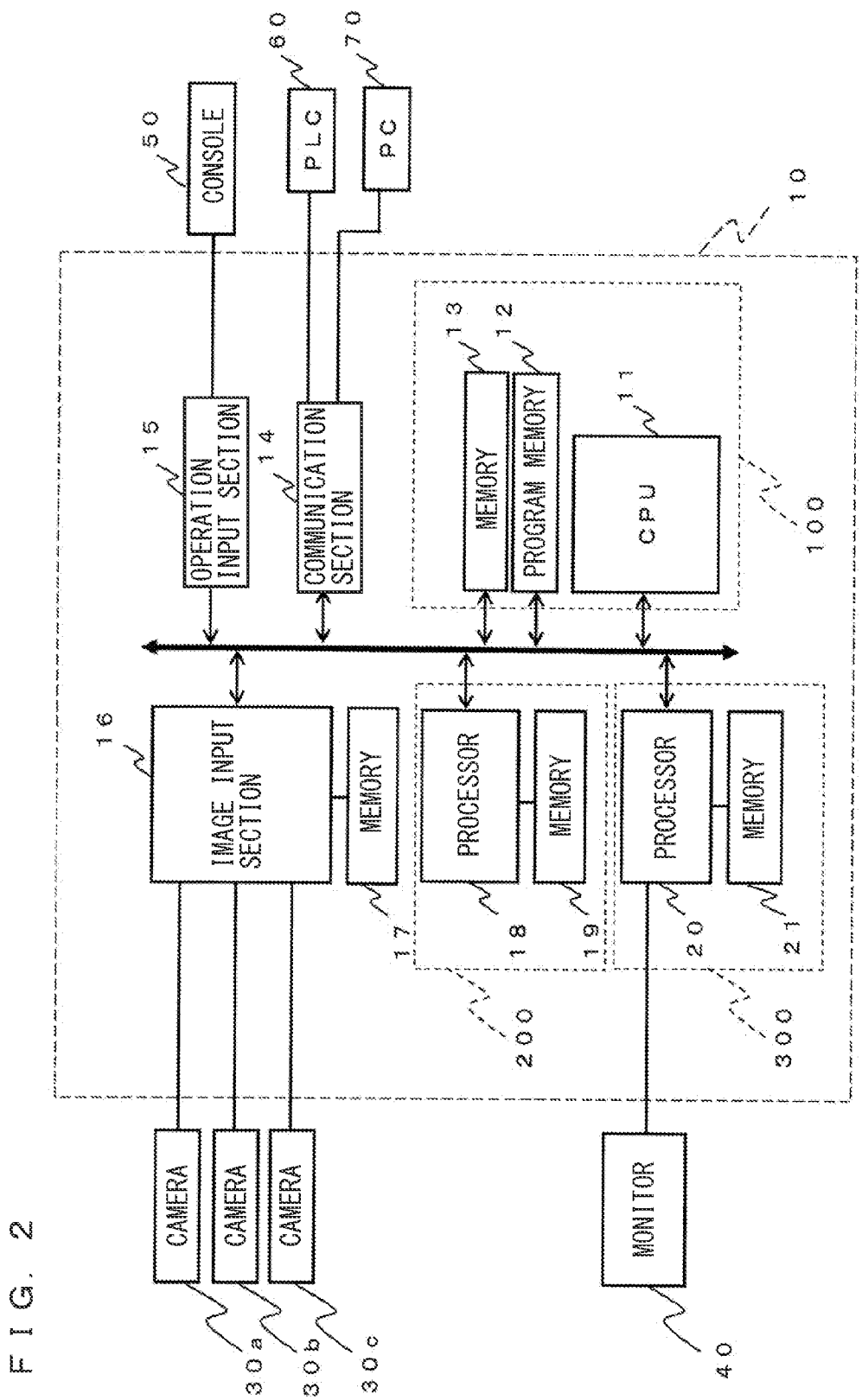
FIG. 2 is a block diagram showing an example of a hardware configuration of a controller in the image processing device according to the present embodiment.

FIG. 2 is a block diagram showing an example of a hardware configuration of the controller 10 in the image processing device 1 according to the present embodiment. As shown in FIG. 2, the controller 10 in the image processing device 1 has: a CPU 11 which performs numerical calculations and information processing based upon a variety of programs, and also controlling each section of the hardware; a program memory 12, such as a ROM, a flash ROM or an EEPROM, where an activation program and an initialization program are stored; a (volatile or nonvolatile) memory 13, such as a RAM, which functions as a work area when the CPU 11 executes a variety of programs; a communication section 14 communicably connected to the external PLC 60 and PC 70; and an operation input section 15, into which an operation signal from the console 50 is inputted.

Further, the image processing device 1 has: an image input section 16, such as an ASIC (Application Specific Integrated Circuit), which captures image data obtained by imaging with the cameras 30a to 30c; a memory (frame buffer) 17 which buffers image data; a processor 18, such as a DSP for computing, which executes measurement processing such as edge detection and area calculation; a memory (work memory) 19 which stores image data for performance of measurement processing; a processor 20, such as a DSP for display, which displays an image on the monitor 40 such as a liquid crystal panel; and a memory 21, such as a VRAM, which temporarily stores image data when making an image displayed. Each of the hardware is communicably connected through a communication channel such as a bus.

The program memory 12 is stored with a control program for controlling the image input section 16, the processor 18, the processor 20, and both the communication section 14 and the operation input section 15 by means of a command of the CPU 11 or the like. Further, in the present embodiment, the processing sequence program produced on the PC 70 and transmitted from the PC 70 is stored into the program memory 12. It is to be noted that this program can also be stored into the memory 13. The memory 13, the memory 17, the memory 19 and the memory 21 are made up of volatile memories such as an SRAM and an SDRAM, and provided as individually independent memories in the controller 10. It should be noted that nonvolatile memories can be used, or a storage area of one memory can be cut into pieces to constitute the respective memories. The communication section 14 functions as an interface (I/F) which receives an imaging trigger signal from the PLC 60 when a trigger input is made in a sensor (photoelectric sensor, etc.) connected to the external PLC 60. Further, the communication section 14 also functions as an interface (I/F) which receives an image processing program for the image processing device 1, layout information that defines a display mode of the monitor 40, and the like, which are transmitted from the PC 70.

Upon receipt of the imaging trigger signal from the PLC 60 through the communication section 14, the CPU 11 transmits an imaging command (command) to the image input section 16. Further, the CPU 11 transmits, to the processor 18 and the processor 20, commands instructing image processing to be executed based upon the processing sequence program. It is to be noted that as a device for producing an imaging trigger signal, not the PLC 60 but a sensor for trigger input, such as a photoelectric sensor, can be directly connected to the communication section 14.

The operation input section 15 functions as an interface (I/F) which receives an operation signal from the console 50 based upon an operation by the user. The received operation signal is transmitted to the CPU 11. On the monitor 40, contents of the operation by the user with use of the console 50 are displayed. Specifically describing, the console 50 is arranged with parts such as a decision button, a cancel button, and a cross-shaped key for moving a cursor displayed on the monitor 40 from side to side and up and down. By operating each of these parts, the user can create a flowchart on the monitor 40, edit a parameter value of each image processing unit, edit a registered image, and start a simulation.

The image input section 16 captures image data in accordance with the foregoing image input program. Specifically, for example, upon receipt of a command of imaging with the camera 30a from the CPU 11, the image input section 16 transmits an image data capturing signal to the camera 30a. After imaging has been performed with the camera 30a, the image input section 16 captures image data obtained by the imaging. The captured image data is once buffered (stored into a cache) in the memory 17, and substituted to a previously prepared image variable. This image variable is a variable that, different from a normal variable that treats a numeral value, is allocated as an inputted image of the corresponding image processing unit, to serve as a reference destination in measurement processing and image display.

The processor 18 executes measurement processing on image data. Specifically, first, the image input section 16 reads image data from the memory 17 while referring to the foregoing image variable, and internally transmits the data to the memory 19 through the processor 18. The processor 18 then reads the image data stored into the memory 19, to execute measurement processing.

The processor 20 transmits to the monitor 40 a control signal for making a predetermined image (picture) displayed based upon a display command transmitted from the CPU 11. For example, the processor 20 reads image data before or after measurement processing which is stored in the memory 17 or the memory 19, temporally stores (develops) the data into the memory 21, and transmits a control signal to the monitor 40. The processor 20 also transmits a control signal for making contents of an operation by the user with use of the console 50 displayed on the monitor 40. It is to be noted that the processor 20 has a function to synthesize a flowchart shown by a processing sequence program transmitted from a control section 100, an imaged image transmitted from the image input section 16, and the like for making these displayed on one screen of the monitor 40.

Herein, in the controller 10 in the image processing device 1 according to the present embodiment, the processor 18 and the memory 19 function as a first processing section 200 which executes a plurality of pieces of image processing based upon a command from the CPU 11. Further, the memory 19 functions as an example of the first data storage area and the second data storage area which store data for image processing that is used for at least one piece of image processing among a plurality of pieces of image processing. Meanwhile, the processor 20 and the memory 21 function as a second processing section 300 which executes at least one image processing among the plurality of pieces of image processing based upon a command from the CPU 11. Further, the memory 21 functions as an example of the third data storage area which stores the foregoing data for image processing. The CPU 11, the program memory 12 and the memory 13 function as the control section 100 which transmits to the first processing section 200 and the second processing section 300 commands instructing image processing to be executed. It is to be noted that in each of the first processing section 200 and the second processing section 300, an image processing program is stored which defines each piece of the image processing to be executed in accordance with the command received from the control section 100.

Further, as shown in FIG. 2, the first processing section 200 and the second processing section 300 are separately electrically connected to the control section 100, and also connected in parallel with the control section 100. Hence in the image processing device 1, the normal operation is performed by the control section 100 transmitting to the first processing section 200 a command instructing that the plurality of pieces of image processing be continuously executed based upon the processing sequence program. Meanwhile, the control section 100 transmits to the second processing section 300 a command instructing that data for image processing stored into the memory 21 be edited, and also that image processing by use of the edited data for image processing be executed, thereby to perform a provisional operation (simulation).

According to the image processing device 1 of the present embodiment, the provisional operation can be performed in the second processing section 300 without stopping the normal operation in the first processing section 200. Especially in pattern searching (one example of specific image processing) which is of importance as one of inspection items, a registered image is used as a specific pattern to serve as a reference. It is possible to edit this registered image at the time of performing the provisional operation in the second processing section 300. It is also possible to perform a simulation by use of the registered image after editing. It is further possible to reflect the registered image after editing in a main operation without stopping the normal operation. Hereinafter, a specific description is given with reference to an example of a functional configuration of the controller 10.

[Functional Configuration]

Figure 3:
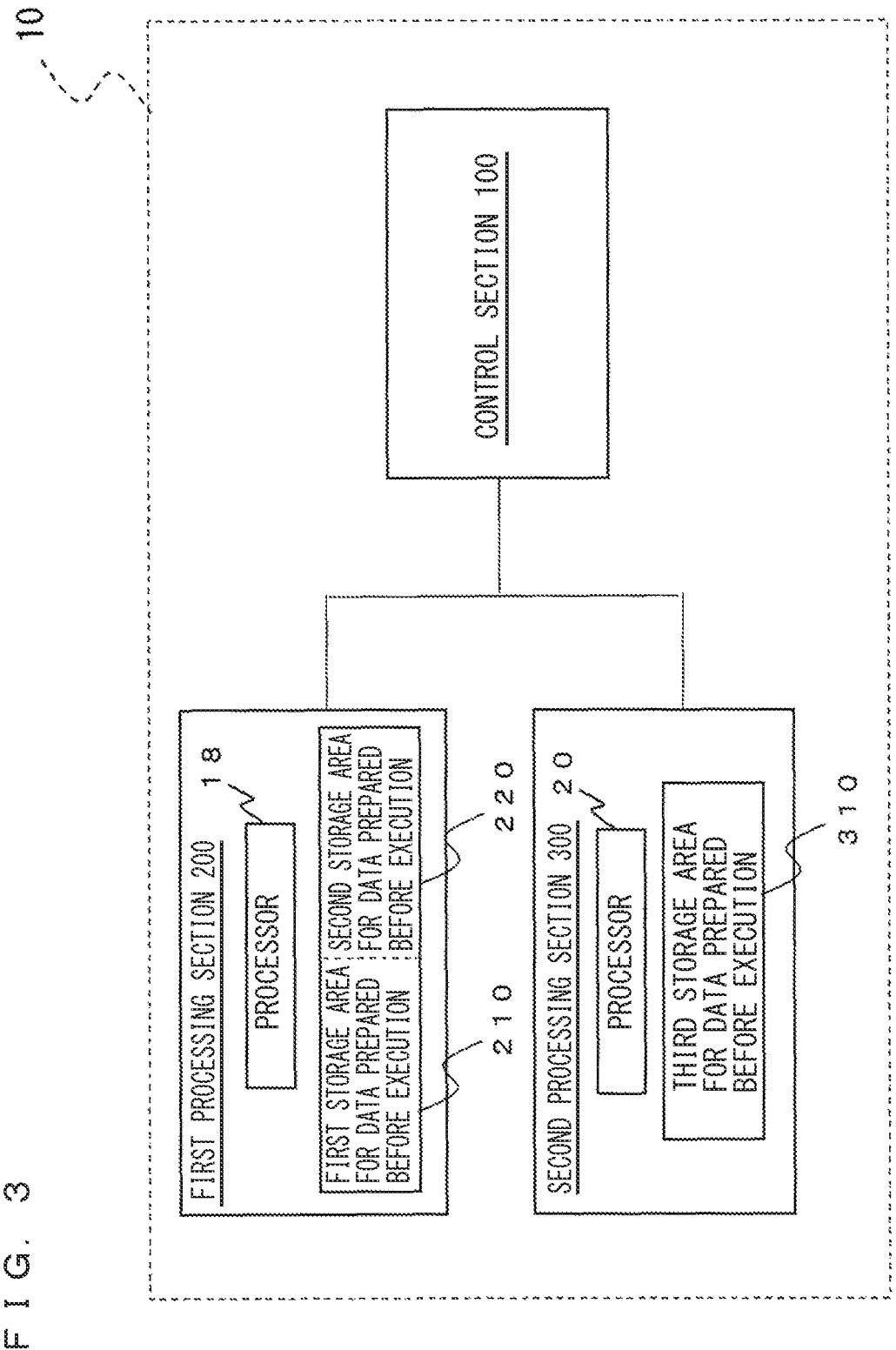
FIG. 3 is a block diagram showing an example of a functional configuration of the controller in the image processing device according to the present embodiment.

FIG. 3 is a block diagram showing an example of a functional configuration of the controller 10 in the image processing device 1 according to the present embodiment. FIGS. 4 to 7 are explanatory diagrams each showing an example of an operation of the controller 10 in the image processing device 1 according to the present embodiment.

As shown in FIG. 3, the controller 10 has the control section 100, the first processing section 200 and the second processing section 300. Further, the first processing section 200 has the processor 18, (and the memory 19 including) a first data storage area 210 and a second data storage area 220. It is to be noted that in the present embodiment, the storage area of the memory 19 shown in FIG. 2 is divided into two storage areas, to realize the first data storage area 210 and the second data storage area 220.

Moreover, image data on a registered image (registered image data) for use in the foregoing pattern searching is read by the control section 100 from a predetermined external input/output device (USB memory, etc.) into the memory 13 before starting of the normal operation, and the data is transmitted to the memory 19 of the first processing section 200, edited by the first processing section 200, and then loaded (stored) into the first data storage area 210. Alternatively, by the user operating the console 50 on the monitor 40, the data is produced in the first processing section 200 and stored into the first data storage area 210 before starting of the normal operation.

It is to be noted that the registered image data is an example of data for image processing that is previously prepared by the user and used for at least one image processing, and since this is data remaining unchanged with respect to each measurement, the data can be previously edited before starting of the normal operation, so as to make measurement processing faster. The registered image data may be image data formed by combining a measurement area, a mask area and the like, image data subjected to filtering, color deposition, downsize processing, or the like, and image data arbitrarily created by the user. Other than the above, the data for image processing may be program data after compilation that is created by the user. Besides, the data for image processing may be data including geometrical characteristics.

Figure 4:
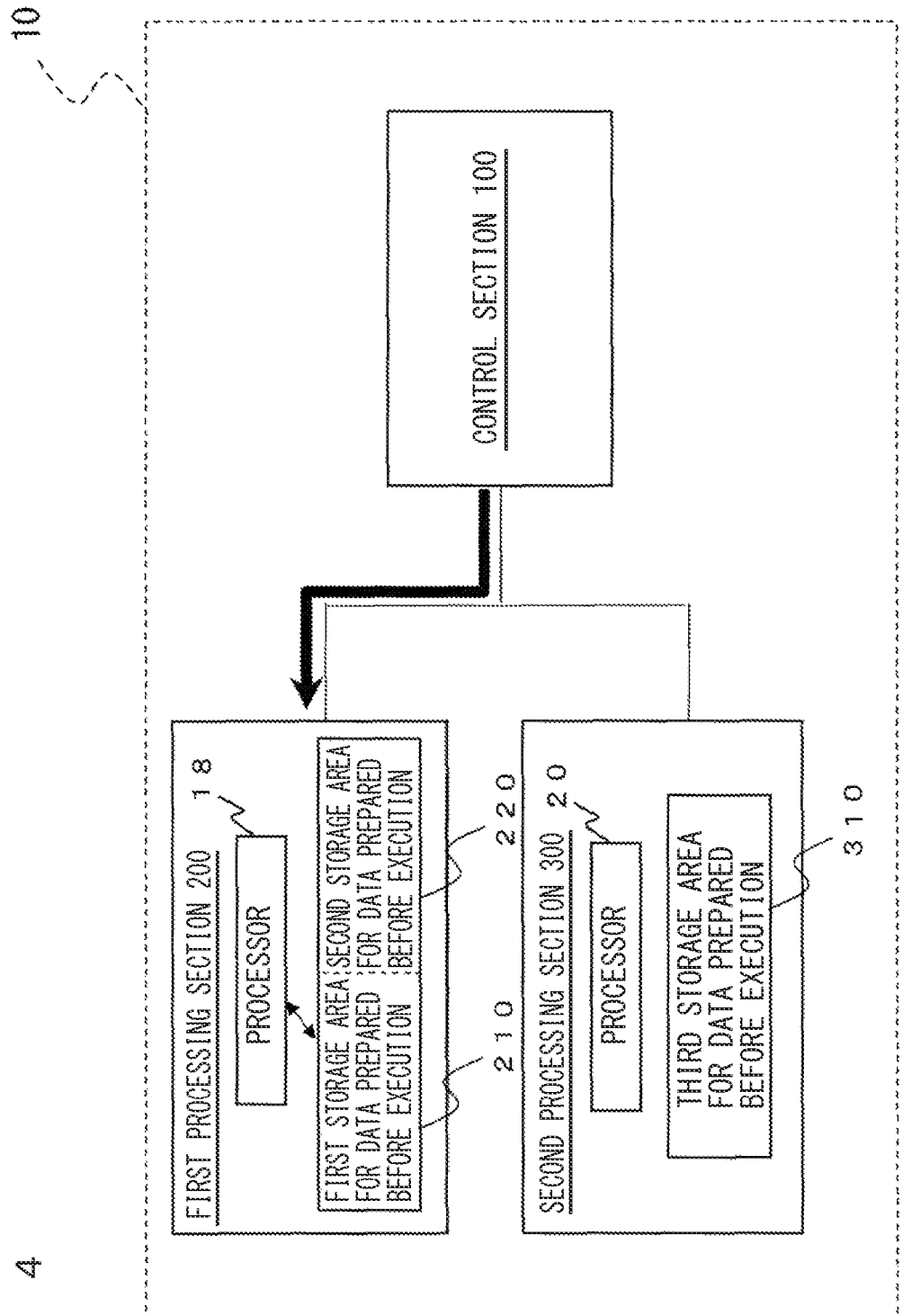
FIG. 4 is an explanatory diagram showing an example of an operation of the controller in the image processing device according to the present embodiment.

FIG. 4 shows a state where the normal operation is performed in the first processing section 200. Specifically, based upon the processing sequence program, the control section 100 transmits to the processor 18 of the first processing section 200 a command instructing image processing to be executed (cf. arrow in the figure). At this time, based upon the command from the control section 100, in the case of pattern searching where registered image data is used as a parameter in the image processing to be executed, the registered image data is read from the first data storage area 210 and executed (cf. a shaded area in the figure).

Figure 5:
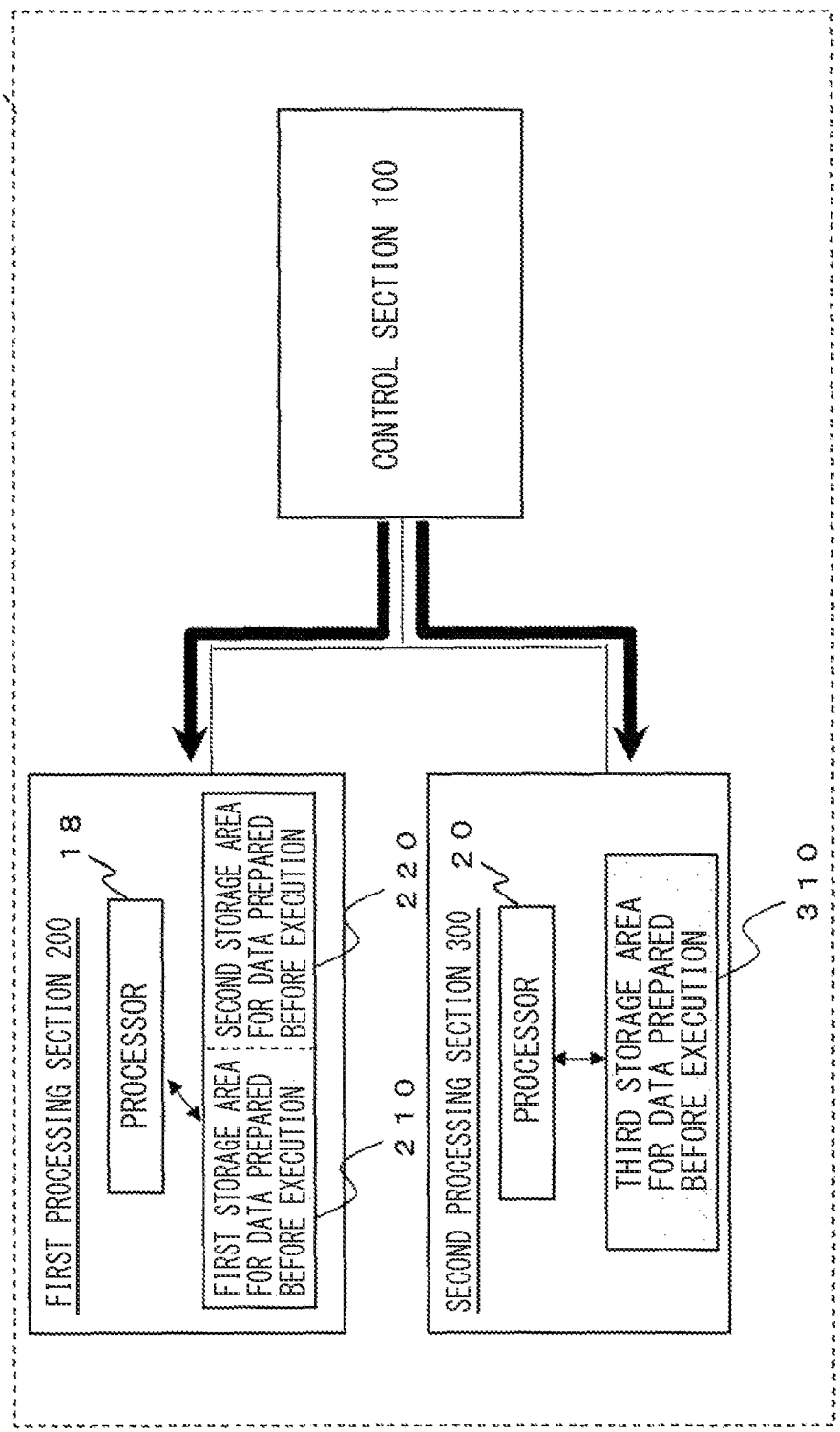
FIG. 5 is an explanatory diagram showing an example of the operation of the controller in the image processing device according to the present embodiment.

FIG. 5 shows a state where a registered image is edited and simulated in the second processing section 300 without stopping the normal operation in the first processing section 200. Specifically, the control section 100 transmits to the processor 18 of the first processing section 200 a command instructing that the plurality of pieces of image processing be continuously executed, while upon receipt of an operation signal based upon the operation of the console 50 by the user, the control section 100 transmits to the processor 20 of the second processing section 300 a command instructing that data for image processing stored into a third data storage area 310 be edited, and also transmitting a command instructing that image processing by use of the edited data for image processing be executed (cf. arrows in the figure). For example, when the user selects a registered image that the user wishes to edit on the monitor 40, registered image data is loaded into the third data storage area 310 from the foregoing predetermined external input/output device (which may be the memory 17 connected to the image input section 16 shown in FIG. 2 or may be the memory 13 of the control section 100 shown in FIG. 2). When the user then performs editing of the registered image such as setting a measurement area and a mask area on the monitor 40 (detailed later), the processor 20 edits the registered image data stored in the third data storage area 310 into a new registered image data set with the measurement area and the mask area, based upon the command from the control section 100.

Upon completion of editing the registered image, a simulation is performed in the second processing section 300. Similarly to editing of the registered image, by the user performing a predetermined operation on the monitor 40, the processor 20 reads new registered image data set with the mask area stored in the third data storage area 310, to perform image processing such as pattern searching (cf. shaded area in the figure). At this time, a simulation may be performed only by pattern searching by use of the edited registered image data, or when all registered image data to be used in image processing defined by the processing sequence program are stored in the third data storage area 310, an overall simulation may be performed where all image processing defined by the processing sequence program are executed.

Figure 6:
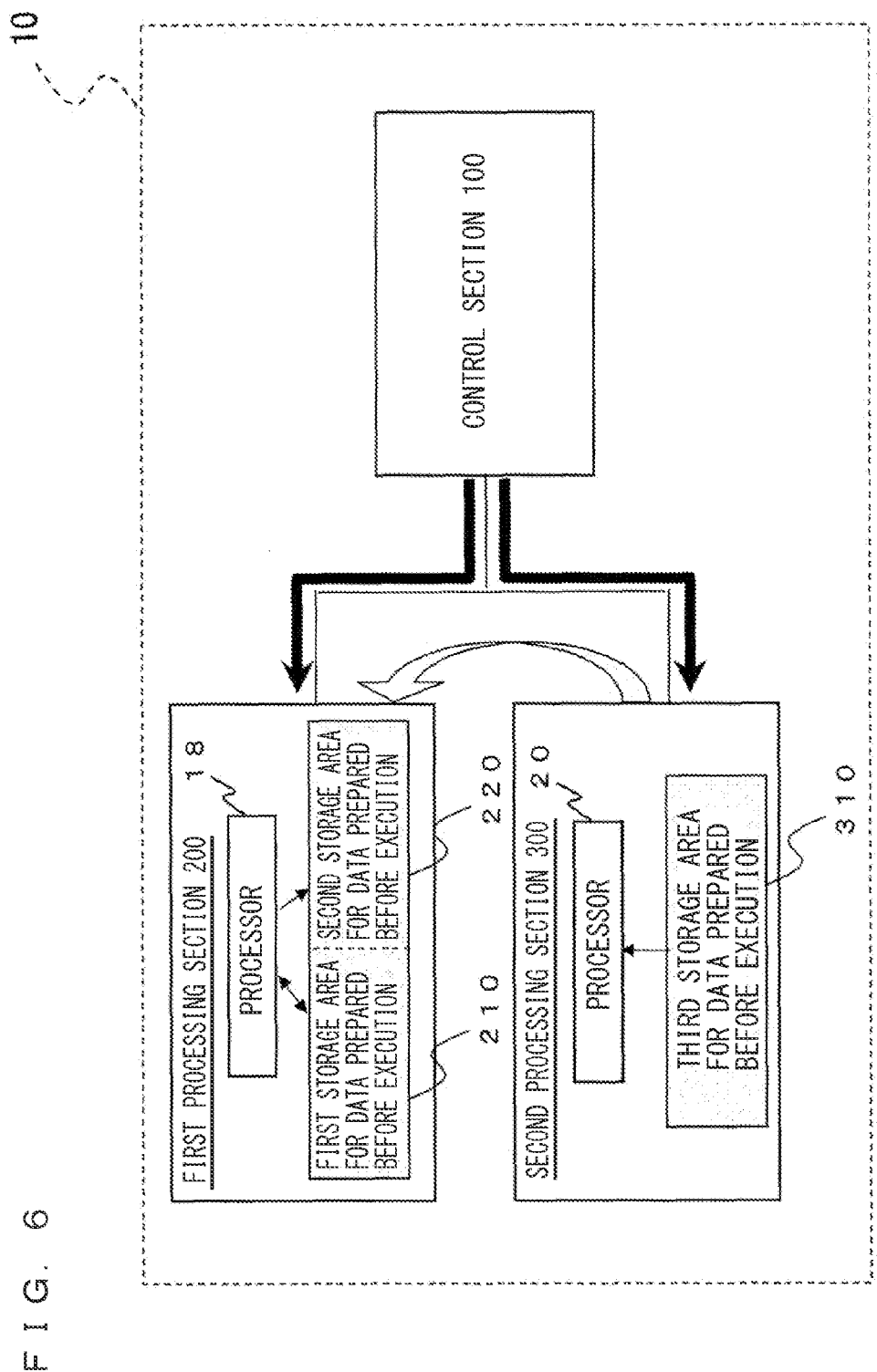
FIG. 6 is an explanatory diagram showing an example of the operation of the controller in the image processing device according to the present embodiment.

FIG. 6 shows a state where the registered image data stored in the third data storage area 310 of the second processing section 300 is transmitted to the second data storage area 220 of the first processing section 200. Specifically, when the edited data for image processing is wished to be reflected in the image processing (normal operation) that is continuously executed in the first processing section 200, the user performs a predetermined operation on the monitor 40. Thereby, the control section 100 reads registered image data after editing which is stored in the third data storage area 310, and stores this data into the memory 13 (FIG. 2). The control section 100 then transmits to the first processing section 200 a command instructing that the edited data for image processing be read from the memory 13 and stored into the second data storage area 220.

At this time, in the first processing section 200, the processor 18 accesses the first data storage area 210, and continuously executes the plurality of pieces of image processing based upon the command from the control section 100. Therefore, the processor 18 of the first processing section 200 interrupts the currently executing image processing (or interrupts during executing of the image processing), or interrupts between the previous and subsequent image processing, and reads the edited registered image data from the memory 13, to store the data into the second data storage area 220. Thereby, the processor 18 can store the transmitted registered image into the second data storage area 220 while giving priority to accessing the first data storage area 210 to continuously execute the plurality of pieces of image processing.

Further, in the case of a volume of the registered image data being large, interrupting the currently executing image processing or interrupting between the previous and subsequent image processing among the plurality of pieces of image processing might cause stoppage of the normal operation or cause significant deterioration in processing capacity of the normal operation. In such cases, at the time of reading the edited registered image data from the memory 13 based upon the command from the control section 100, the processor 18, for example, divides the data into small units such as sector units, and sequentially (gradually) stores the data into the second data storage area 220. This can prevent stoppage of the normal operation and significant deterioration in processing capacity of the normal operation even if the speed of the normal operation is somewhat reduced.

Moreover, in the present embodiment, the registered image data after editing, which is stored in the third data storage area 310, is stored not into a storage area outside the first processing section 200 (e.g. memory shared in the image processing device 1), but into the second data storage area 220 inside the first processing section 200. In the second data storage area 220, with the processor 18 being mainly an accessible dedicated memory (corresponding to the memory 19 in FIG. 2), the registered image data after editing can be read at a high speed in the first processing section 200 at the time of performing image processing by use of the registered image data after editing, such as pattern searching.

Figure 7:
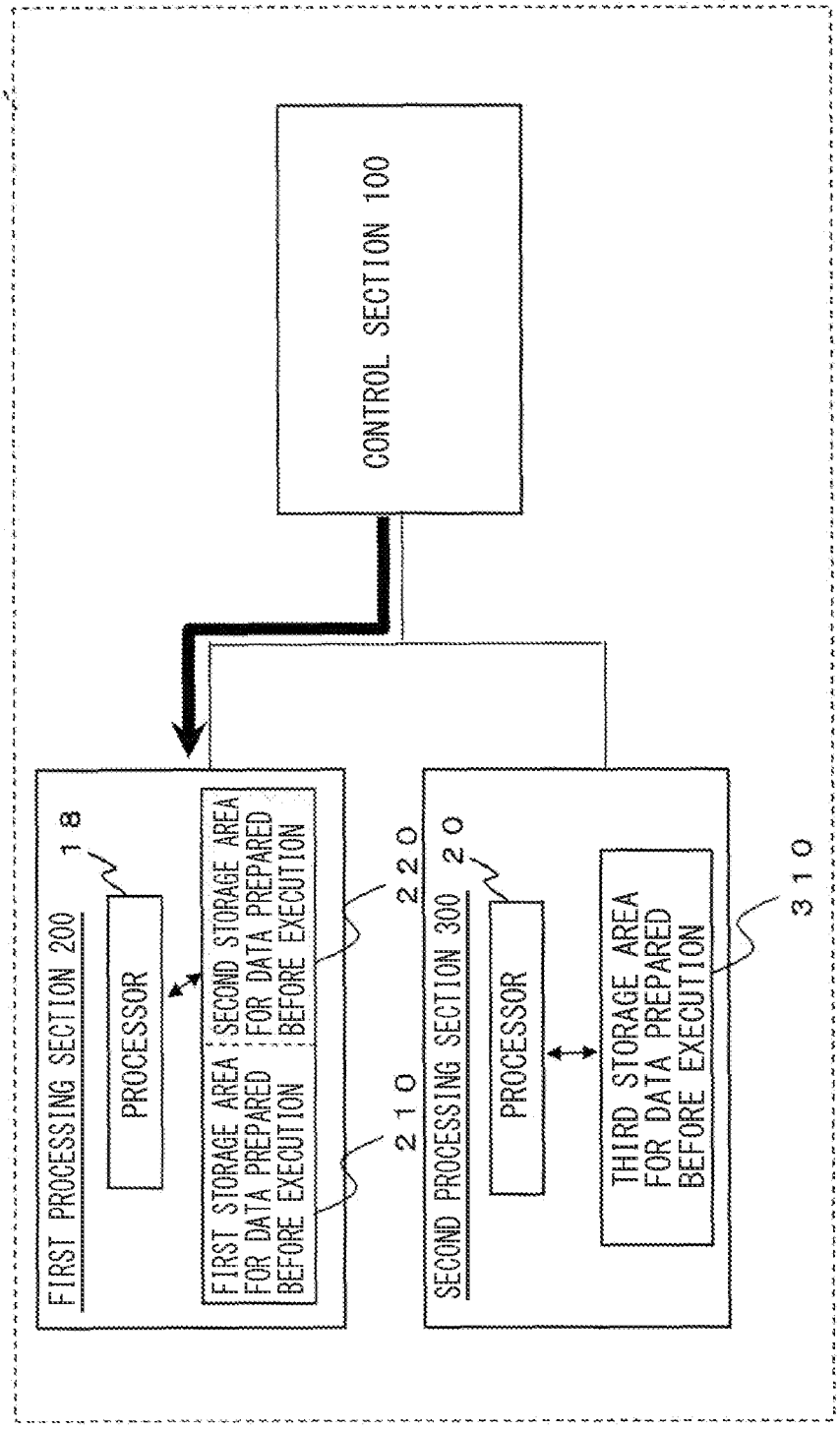
FIG. 7 is an explanatory diagram showing an example of the operation of the controller in the image processing device according to the present embodiment.

FIG. 7 shows a state where a destination, from which the processor 18 reads registered image data in the first processing section 200, is switched from the first data storage area 210 to the second data storage area 220. Specifically, in the case of making the processor 18 perform image processing by use of the registered image data after editing, such as pattern searching, as the normal operation, the control section 100 instructs the processor 18 to read the registered image data after editing not from the first data storage area 210 (cf. FIG. 4) but from the second data storage area 220. Thereby, for example, in the timing after completion of one flow period of the currently executing flow and immediately before starting of one flow period of the next flow, the destination for reading the registered image data is switched, and the registered image edited by the user can be reflected in the normal operation without stopping the normal operation. It should be noted that, although the description was given focusing upon the registered image data after editing among the data stored in the second data storage area 220 in the present embodiment, there are cases where, for example, the second data storage area 220 includes registered image data after editing and registered image data which is unedited due to no need for editing. In this case, the registered image data which is unedited due to no need for editing can be transmitted from the first data storage area 210 to the second data storage area 220. Further, the data can be switched from the first data storage area 210 to the second data storage area 220 after completion of all transmission to the second data storage area 220. In this case, after completion of all transmission, the second data storage area 220 provides data for image processing which is required for the normal operation, and the first data storage area 210 becomes a destination for transmitting the registered image data after editing. It is to be noted that the destination for reading may be switched by means of software by switching a pointer designating destination, or the like.

[Processing Operation]

Figure 8:
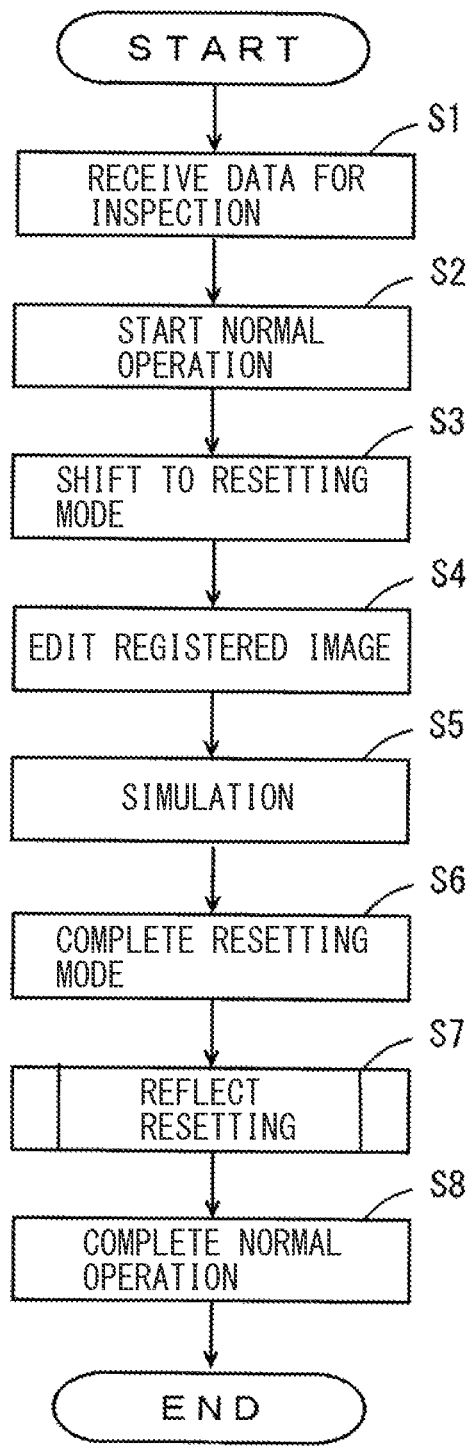
FIG. 8 is a flowchart showing a processing operation of the image processing device according to the present embodiment.
Figure 9:
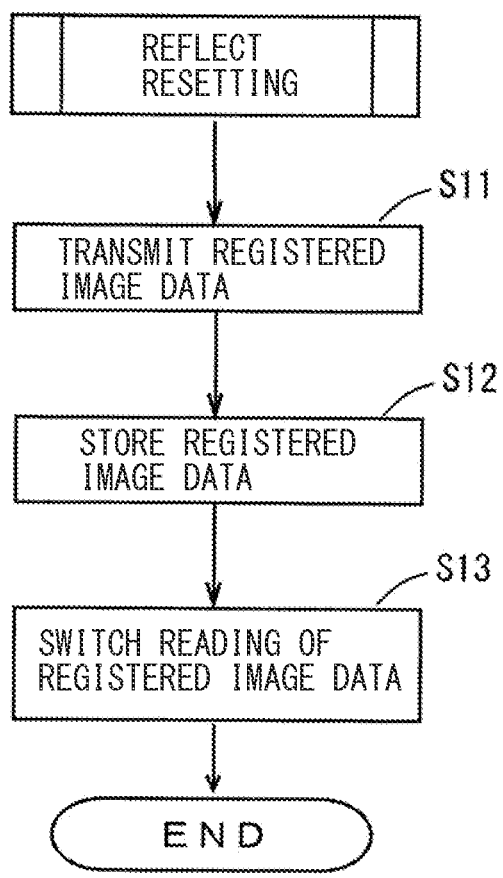
FIG. 9 is a flowchart showing a processing operation of the image processing device according to the present embodiment.

FIGS. 8 and 9 are flowcharts each showing a processing operation of the image processing device 1 according to the present embodiment. Especially, FIG. 9 is a flowchart for describing reflection of a resetting (step S8) in FIG. 8 in detail. Further, FIGS. 10 to 19 show examples (partial excerpts) of display screens of the monitor 40 when the processing operations shown in FIG. 8 is being performed.

In FIG. 8, first, data for inspection is received in the image processing device 1 as a preparation step before starting of the operation (step S1). Specifically describing, for example, in the PC 70 (cf. FIG. 2) made up of a general-purpose personal computer, a program creation supporting software has been installed, and by execution of this software, the PC 70 functions as a program creation supporting device. On the monitor screen, while operating a mouse and a key board, the user selects a plurality of pieces of image processing as inspection items and arranges those into a desired sequence, to create a flowchart showing a processing sequence. That is, a series of image processing made to be executed by the controller 10 is blocked as an image processing unit, and by the user just arranging the image processing unit on an execution flow, it is possible to create a flow sequence for performing predetermined processing based upon a result of processing of a previous image processing unit.

Such a flowchart starts with a start symbol and ends with an end symbol, and a flow sequence from the start symbol to the end symbol is one flow period. Further, along with creation of the flowchart, parameter values are set for the respective inspection items, and a registered image is set which is used in image processing such as pattern searching and becomes a reference as a specific pattern. In the setting of the registered image, although an existing registered image may be used as it is, for example, a more optimal registered image can be edited for example by setting a mask area (editing of the registered image is detailed later).

Upon completion of creating the flowchart, setting the parameter values and setting of the registered image in this manner, the created flowchart is converted into setting data (processing sequence program) interpretable by the controller 10. By the user clicking a predetermined button or the like on the monitor screen of the PC 70, the foregoing setting data, parameter values, data on the registered image (registered image data) and the like are transmitted as data for inspection from the PC 70 to the controller 10. This data for inspection is then received in the image processing device 1 (step S1).

It is to be noted that the received data for inspection is stored into the respective sections of the image processing device 1. Specifically, the processing sequence program and the parameter values are stored into the memory 13 of the control section 100, and the registered image data is stored into the first data storage area 210 of the first processing section 200 based upon the command from the control section 100. As described above, by previously storing the registered image data, which becomes necessary for pattern searching and the like, into the first data storage area 210 before starting of the operation, measurement processing can be executed at a high speed.

Next, the normal operation is started (step S2 of FIG. 8). Specifically, the CPU 11 of the control section 100 reads parameter values to be used for image processing to be executed from the memory 13 based upon the processing sequence program stored into the memory 13, and also transmits the parameter values to the processor 18 of the first processing section 200 along with a command instructing the image processing to be executed. Having received these, the processor 18 allocates the received parameter values to the corresponding parameters of the image processing at the time of executing the image processing based upon the command received from the CPU 11. Moreover, in the case of the image processing to be executed being image processing by use of registered image data, such as pattern searching, registered image data is read from the first data storage area 210. When the image processing is executed in the processor 18, its execution result is transmitted to the control section 100.

As thus described, based upon the processing sequence program, a series of image processing is repeated, the processing being transmission of a command instructing image processing to be executed and required parameter values from the control section 100 to the first processing section 200, reading of registered image data as needed in the first processing section 200, execution of image processing, and subsequent transmission of an execution result from the first processing section 200 to the control section 100, and thereby the normal operation is performed.

Figure 10:
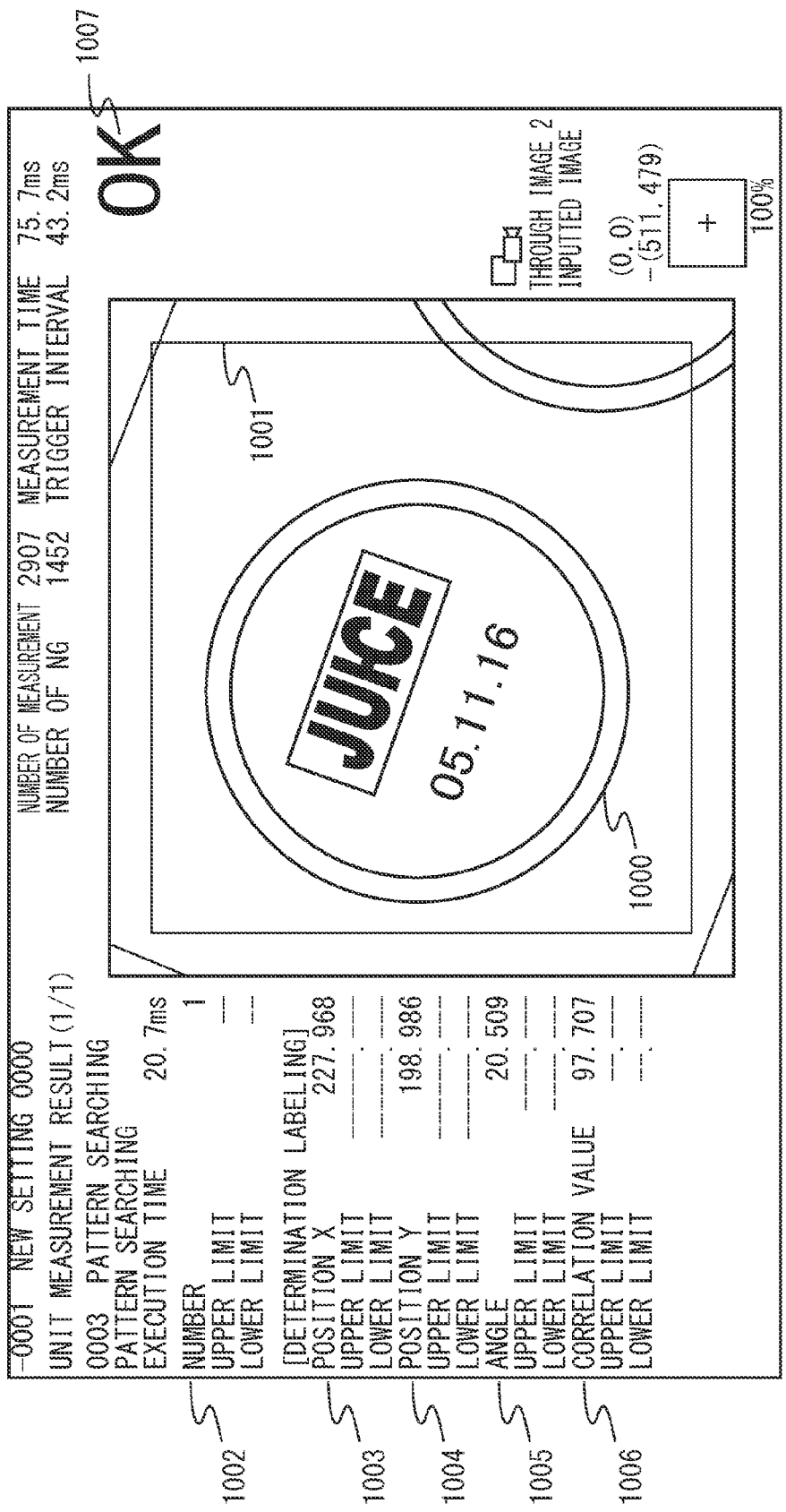
FIG. 10 is an example of a display screen of a monitor when a processing operation shown in FIG. 8 is being performed.

During the normal operation, for example, an image (picture) as shown in FIG. 10 is displayed on the display screen of the monitor 40. FIG. 10 shows a state where a result of execution of pattern searching is displayed on the monitor 40. Pattern searching is processing (image processing unit) of previously registering a specific pattern as an image to be a reference, detecting a portion most similar to this registered image among inputted images, and measuring a position, an angle and a correlation value of that portion. In the present embodiment, an image inside a rectangular frame including "JUICE" is adopted as the registered image, while the center of gravity of the rectangular frame is adopted as a parameter indicating the detected position. Further, the detected position of this registered image is specified by a coordinate indicated by an X-axis extending in the right direction and a Y-axis extending in the downward direction with the upper left corner of a search area 1001 taken as an original point (0, 0). Further, the search area 1001 of the rectangular frame is an area for searching whether or not a portion similar to the registered image is present.

In the example shown in FIG. 10, as a result of execution of pattern searching on a work 1000 inside the search area 1001, it has been detected that the number 1002 of registered images is one, an X-coordinate 1003 of the detected position of the registered image is 227.968, a Y-coordinate 1004 of the detected position of the registered image is 198.986, an angle 1005 indicating the degree of inclination of the registered image from the horizontal direction (X-axis direction in FIG. 10) is 20.509 degrees, and a correlation value 1006 indicating the degree of similarity of the detected image to the registered image is 97.707. Based upon the X-coordinate 1003, the Y-coordinate 1004, the angle 1005 and the correlation value 1006, a determination result 1007 of the work 1000 has been determined as "OK".

In such a manner, a plurality of pieces of image processing including pattern searching are executed on the plurality of works 1000 flowing along a production line. At this time, through use of a resetting mode, it is possible for the user to edit a registered image for use in pattern searching and perform a simulation by use of the edited registered image without stopping the normal operation. Additionally, it is possible to reflect the edited registered image in the normal operation without stopping the normal operation. Hereinafter, the resetting mode is described in detail.

On the monitor 40, the user performs a predetermined operation with the console 50 (e.g. click a "resetting button" in a menu bar) so that the mode is shifted to the resetting mode (step S3 of FIG. 8). Specifically, upon receipt of an operation signal from the operation input section 15, the CPU 11 of the control section 100 transmits to the second processing section 300 the same data as the registered image data that was transmitted to the first processing section 200 before starting of the normal operation. Thereby, registered image data for editing is stored into the third data storage area 310. It should be noted that, although the same data as the registered image data that was transmitted to the first processing section 200 before starting of the normal operation is transmitted herein, for example, image data stored into the memory 17 through the image input section 16 can also be transmitted as the registered image data for editing, or image data stored into the external input/output device (USB device) or the like which is connected to the image processing device 1 can also be transmitted as the registered image data for editing.

Figure 11:
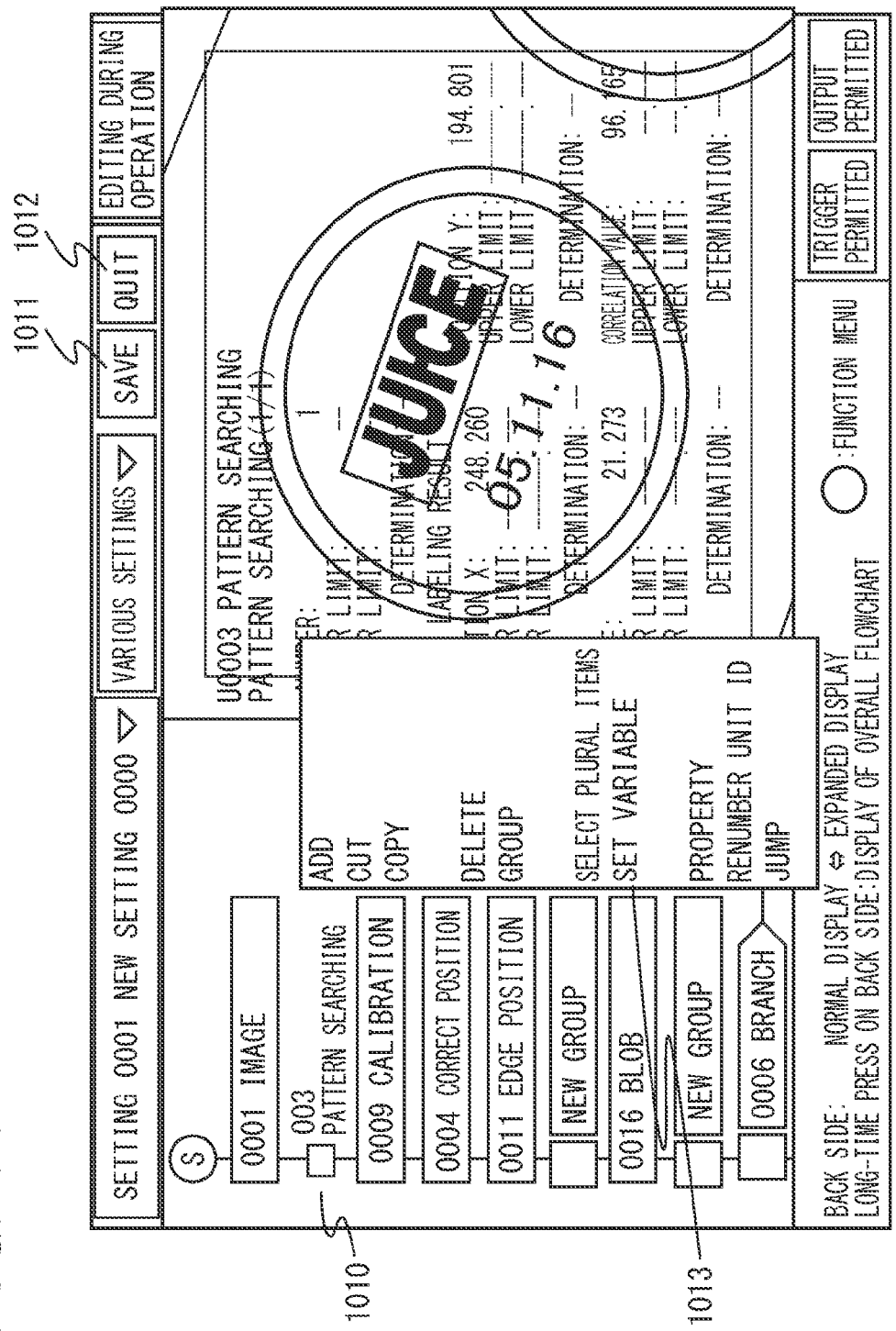
FIG. 11 is an example of the display screen of the monitor when the processing operation shown in FIG. 8 is being performed.
Figure 12:
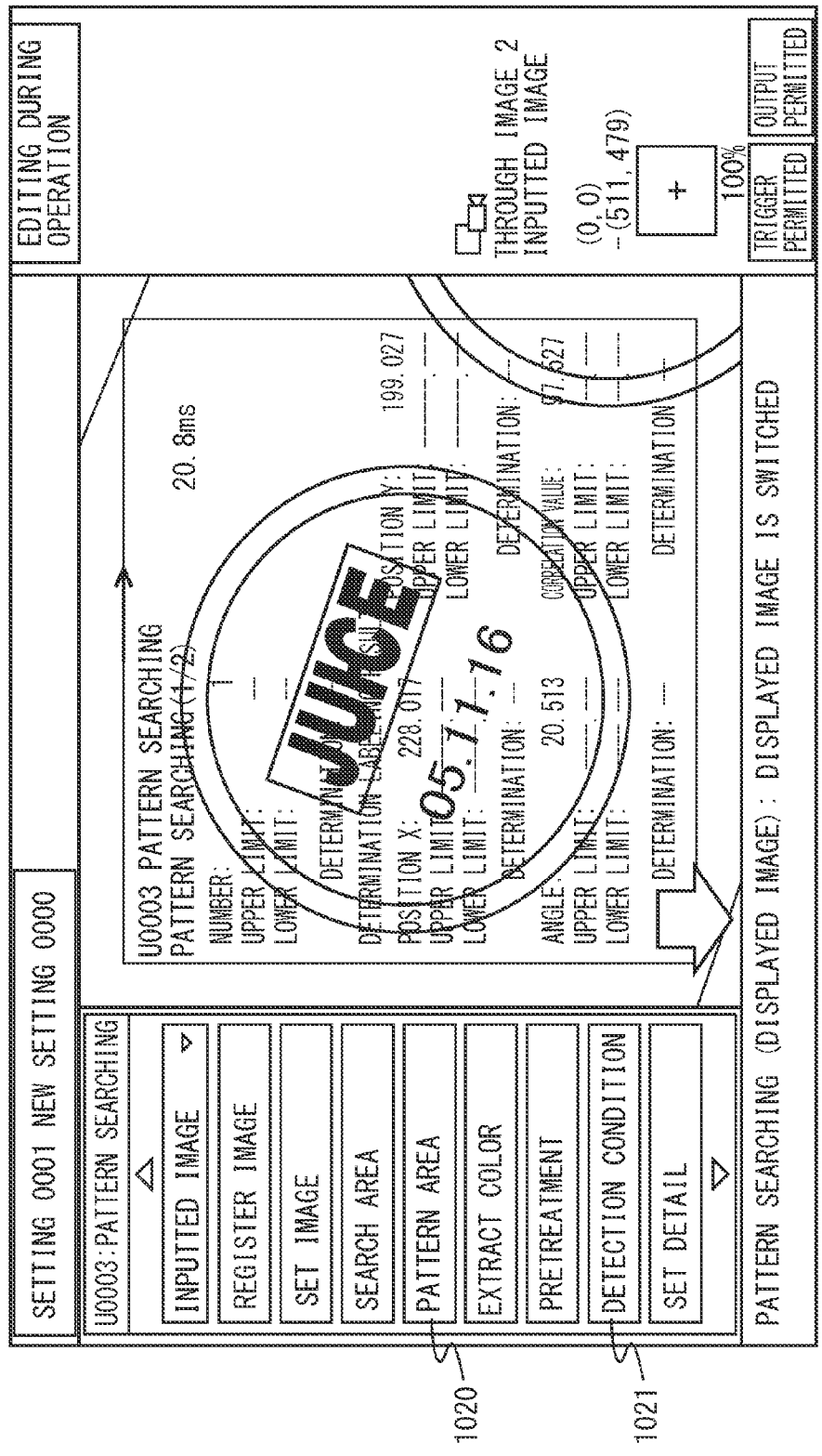
FIG. 12 is an example of the display screen of the monitor when the processing operation shown in FIG. 8 is being performed.

Further, the CPU 11 of the control section 100 transmits to the monitor 40 a command instructing that an image for the resetting mode be displayed. This results, for example, in switching of the display screen of the monitor 40 from the screen shown in FIG. 10 to the screen shown in FIG. 11. At the upper right end of FIG. 11, "editing during operation" is displayed, meaning that the normal operation is being continuously performed even after the shift to the resetting mode. As shown in FIG. 11, in the flowchart created by the user, an imaging unit, a pattern searching unit 1010, a calibration unit, a position correcting unit, an edge position, . . . are arranged in this sequence downward from the start symbol. Further, a function menu is displayed on the right side of the flowchart where editing, such as addition, cutting, copying, deleting and grouping of an inspection item, can be performed on the flowchart.

Figure 13:
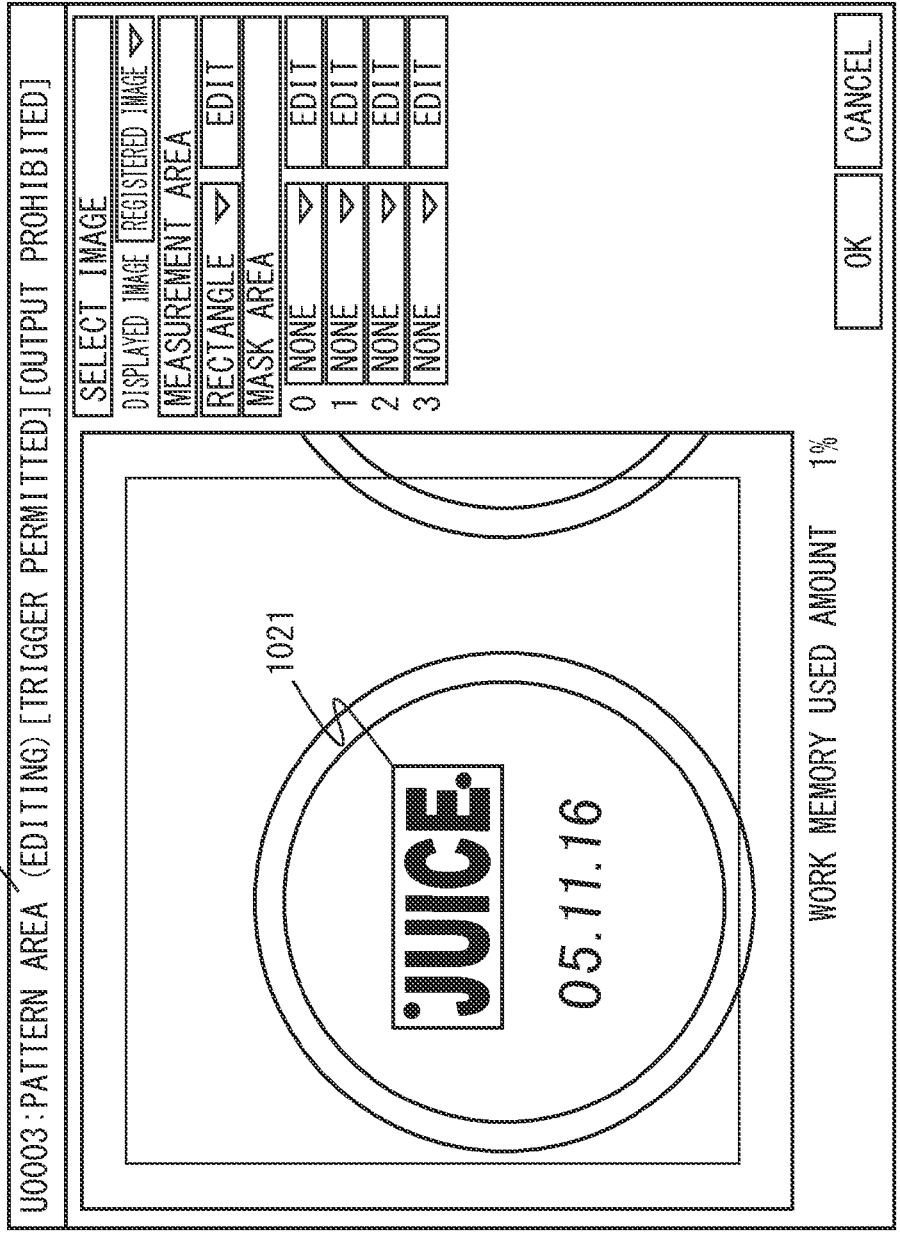
FIG. 13 is an example of the display screen of the monitor when the processing operation shown in FIG. 8 is being performed.

Next, the user edits the registered image (step S4 of FIG. 8). Specifically, based upon an operation signal received from the operation input section 15, the CPU 11 of the control section 100 transmits to the second processing section 300 a command instructing that the registered image data stored into the third data storage area 310 be edited. Having received the command, the processor 20 of the second processing section 300 accesses the third data storage area 310, to edit the registered image data stored therein. For example, in the screen shown in FIG. 11, when the cursor is put on pattern searching with use of the console 50 and an execution key is pressed, the screen is switched from the screen shown FIG. 11 to the screen in FIG. 12. At the left end of the screen shown in FIG. 12, items editable in pattern searching are displayed, where an inputted image, image registration, image setting, a search area, a pattern area 1020, color extraction, pretreatment, a detection condition 1021, and the like are editable. For example, when the user puts the cursor on the pattern area 1020, and presses the execution key, the screen is switched from the screen shown in FIG. 12 to the screen shown in FIG. 13. FIG. 13 shows a state where the pattern area 1020 has been edited among setting items of the pattern searching unit 1010. In FIG. 13, an image inside the rectangular frame (measurement area) including "JUICE" is displayed as the registered image 1021.

Figure 14:
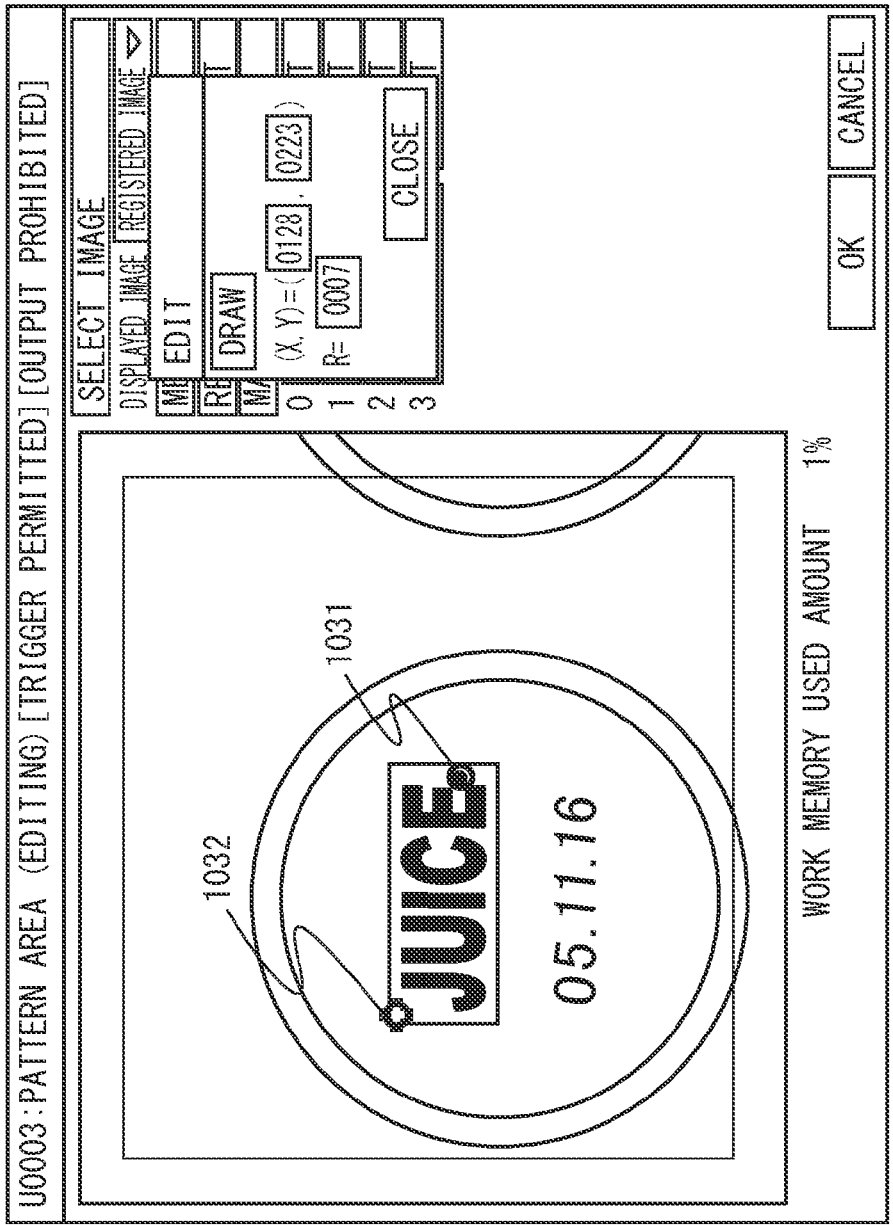
FIG. 14 is an example of the display screen of the monitor when the processing operation shown in FIG. 8 is being performed.
Figure 15:
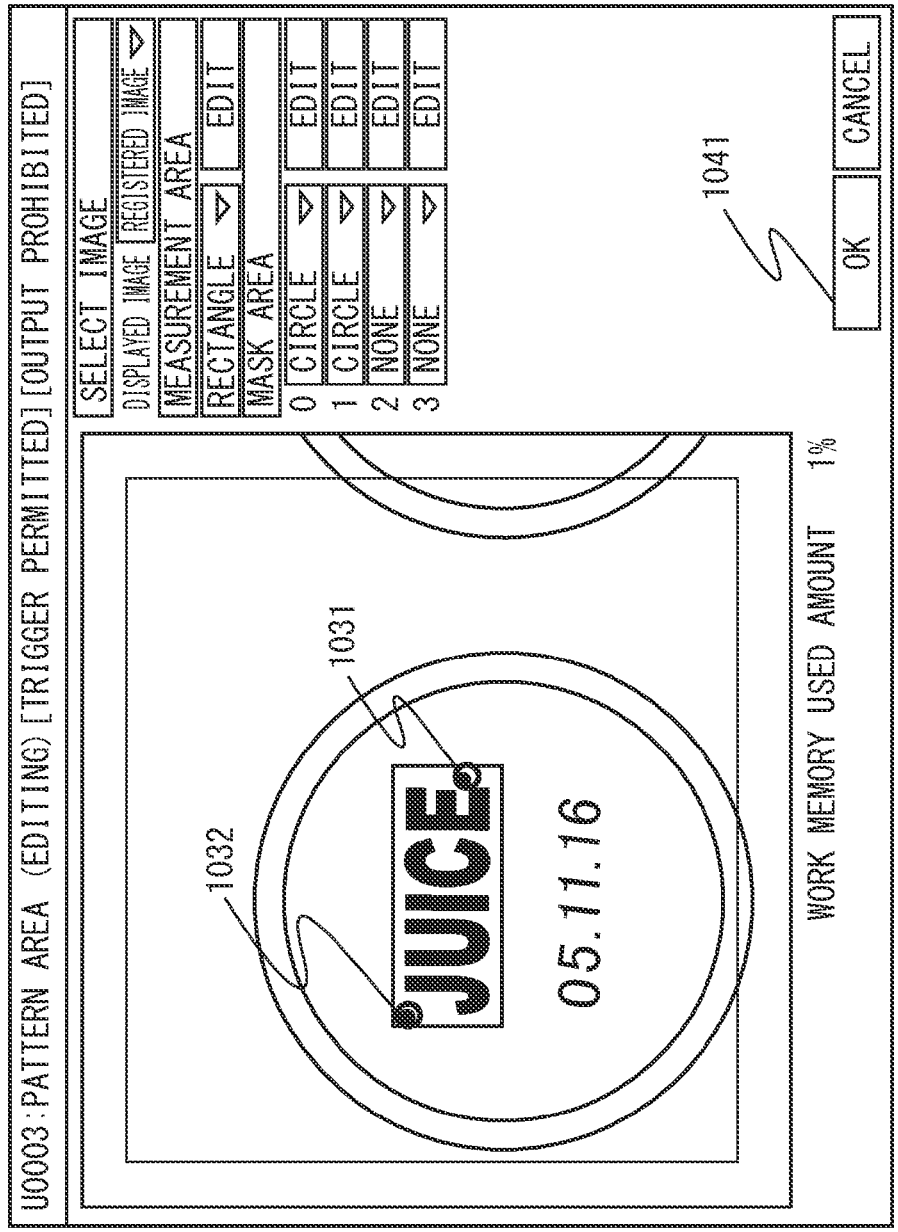
FIG. 15 is an example of the display screen of the monitor when the processing operation shown in FIG. 8 is being performed.

Herein, noises are added to the upper left and the lower right of the inside of the registered image 1021 (slightly larger white noises are added for the sake of simplification of the description). In the case of such noises being included in the registered image, an overall decrease in correlation value, and the like may occur, and a favorable measurement result thus cannot be obtained. Therefore, for example, a portion of the noise can be set as a mask area, thereby to edit the registered image into a more optimal one. In FIG. 13, four mask areas can be set at the maximum (mask areas 0 to 3 displayed on the right of the FIG. 13) with respect to one measurement area. The user puts the cursor on the mask area 0 and clicks it with use of the console 50, and selects a "circle" as the shape of the mask area from a drop-down menu. A central position and a radius R of a circle 1031 are then set such that the foregoing noise on the lower right is included inside the circle 1031 displayed on the monitor 40. Subsequently, the user puts the cursor on the mask area 1 and clicks it with use of the console 50, and similarly to the above, the user selects a "circle" as the shape of the mask area from the drop-down menu, and sets a central position and a radius R of a circle 1032 displayed on the monitor 40 such that the foregoing noise on the upper left is included inside the circle 1032. FIG. 14 shows a state where the central position (0128, 0223) and the radius R (0007) of the circle 1032 is set such that the noise on the upper left is included inside the circle 1032 displayed on the monitor 40. When these settings are completed, as shown in FIG. 15, the insides of the circles 1031, 1032 surrounding the two noises are ignored at the time of performing pattern searching. Editing the registered image in this manner can prevent a decrease in correlation value caused by a noise in the registered image, to enhance the measurement accuracy. When editing of the registered image is completed and an OK button 1041 shown in FIG. 15 is clicked, the registered image set with the mask areas made up of the circles 1031, 1032 is stored into the third data storage area 310 as newly registered image data. In this manner, the OK button 1041 displayed on the monitor 40 is a part image by pressing of which new registered image data edited by the user is stored into the third data storage area 310.

Next, a simulation is performed (step S5 of FIG. 8). Specifically, when the user clicks a predetermined button (not shown) for performing a simulation, based upon an operation signal received from the operation input section 15, the CPU 11 of the control section 100 transmits to the second processing section 300 a command instructing that a simulation be performed by use of the registered image data stored into the third data storage area 310. As image data for testing that is used in the simulation, for example, a plurality of pieces of image data stored into the memory 17 through the image input section 16 are used. The memory 17 has a function to store a plurality of pieces of image data produced by imaging with the cameras 30a to 30c, and provides those image data as image data for testing at the time of a simulation being performed in the second processing section 300. The control section 100 reads the image data previously imaged from the memory 17 through the image input section 16, and transmits the data to the processor 20 of the second processing section 300. Based upon the command from the control section 100, the processor 20 performs a simulation by use of the plurality of pieces of image data for testing transmitted from the image input section 16, while reading the new registered image data after editing (cf. step S4 of FIG. 8, and FIG. 15) stored into the third data storage area 310.

FIG. 16 shows a state where a result of simulations performed using the plurality of pieces of image data for testing is displayed on the monitor 40. The screen shown in FIG. 16 is displayed by selecting a history viewer (not shown) from the function menu with use of the console 50 in the case where the user wishes to check a simulation result. In FIG. 16, image data produced by imaging with a camera 1 (camera 30a) specified by an image variable "&Cam1Img" is used. Further, on the right half of the screen, four inputted images in 2701st to 2704th measurement are displayed, and in a list of determination results on the left half of the screen, any result has been determined as "OK". In this manner, by checking the history viewer, the user can check one by one how the individual image data for testing was determined at the time of the simulation performed by use of the new edited registered image. Further, the user can also select a candidate for the new registered image data among the pieces of image data for testing.

Figure 18:
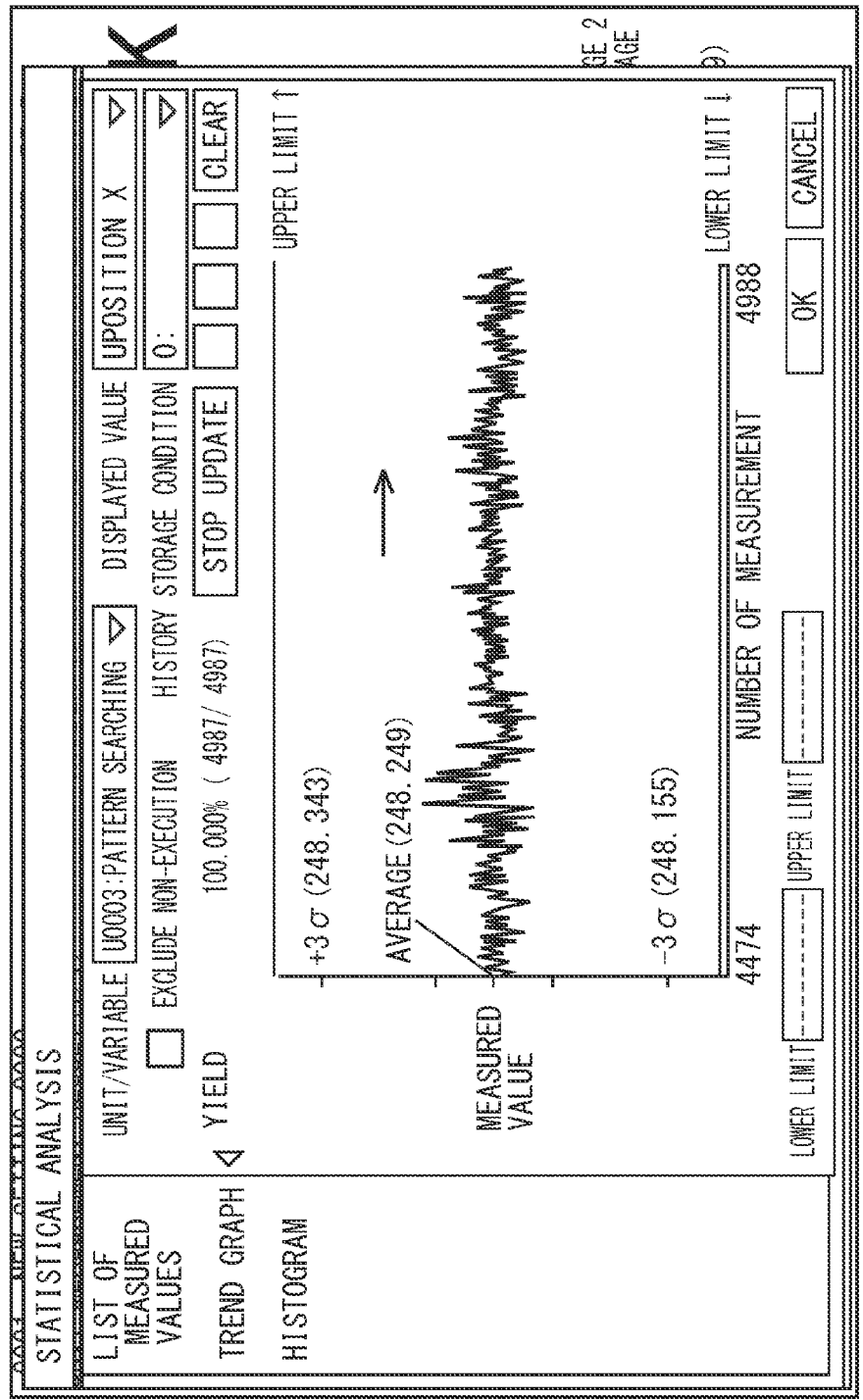
FIG. 18 is an example of the display screen of the monitor when the processing operation shown in FIG. 8 is being performed.
Figure 19:
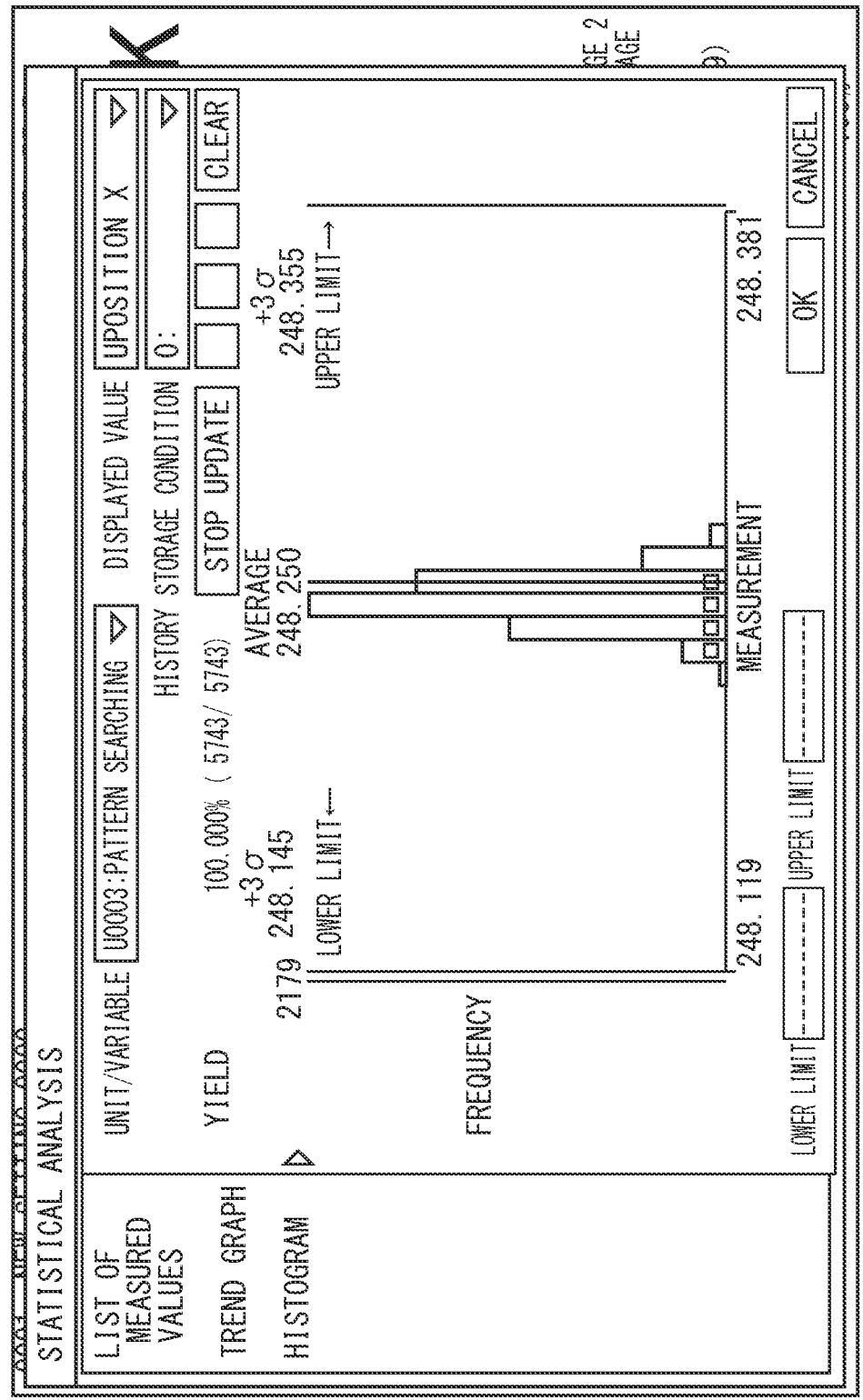
FIG. 19 is an example of the display screen of the monitor when the processing operation shown in FIG. 8 is being performed.

FIGS. 17 to 19 each show a state where a statistical analysis has been performed on the simulation result. The screens shown in FIGS. 17 to 19 are each displayed by selecting a statistical analysis (not shown) from the function menu in the case where the user wishes to perform a statistical analysis on the simulation result. In FIG. 17, based upon the simulation result, a determination result 1051, the number 1052 of measurement, a measured value 1053 of the X-coordinate, and the like with respect to each piece of measurement processing are displayed, while statistic amounts 1054 of measured values, and the like are also displayed. Further, as for the statistic amounts 1054 of the measured values, the amounts are displayed in a trend graph as shown in FIG. 18, and it is thereby possible to visually check, at one view, whether there is no measured value more than three times as large as a deviation a. The amounts are displayed in a histogram as shown in FIG. 19, and it is thereby possible to visually check, at one view, which side from an average measured value an individual frequency tilts to.

In this manner, the user verifies whether the edited registered image is appropriate with reference to the statistical analysis results shown in FIGS. 17 to 19, and when determining that the image is appropriate, the user returns to the screen showing FIG. 11 on the monitor 40, clicks a save button 1011, and then clicks a quit button 1012, to complete the resetting mode (step S6 of FIG. 8). On the other hand, when determining that the edited registered image is not appropriate, the user either re-edits the registered image (step S4 of FIG. 8), or clicks a cancel button (not shown), to complete the resetting mode. When the cancel button is clicked, the image processing device 1 returns to the state before the shift to the resetting mode.

Meanwhile, when the resetting mode is completed with the save button 1011 and the quit button 1012, the resetting is reflected (step S7 of FIG. 8). Specifically, as shown in FIG. 9, the control section 100 captures (reads) into the memory 13 the registered image data after editing which is stored in the third data storage area 310, namely the registered image data set with the mask areas as shown in FIG. 15. Based upon the command from the control section 100, the processor 18 of the first processing section 200 transmits the registered image data stored in the memory 13 to the second data storage area 220 of the first processing section 200 (step S11), and then stores the transmitted data (step S12). Subsequently, in the timing after completion of currently executing one flow period and immediately before starting of the next flow period, the control section 100 transmits a command instructing that the destination from which the processor 18 reads the registered image data in the first processing section 200 be switched from the first data storage area 210 to the second data storage area 220 (step S13). This can result in reflection of contents reset by the user in the normal operation without stopping the normal operation of the image processing device 1.

In addition, as described with reference to FIGS. 10, 16, and the like, the monitor 40 functions as an example of the display section which displays image processing results in the first processing section 200 and the second processing section 300. That is, when image processing is continuously executed in the first processing section 200, based upon the command from the control section 100, the second processing section 300 transmits to the monitor 40 a control signal for displaying the image processing result in the first processing section 200, and when the data for image processing stored into the third data storage area 310 is edited and image processing is executed by use of the edited data for image processing in the second processing section 300, based upon the command from the control section 100, the second processing section 300 transmits to the display section a control signal for displaying the image processing result in the second processing section 300.

Further, although the command for switching the destination for reading the registered image data was transmitted in the timing immediately before starting of the next flow period in the foregoing embodiment, the command can be transmitted in any timing. For example, the command may be previously transmitted before completion of the currently executing flow period, and may be executed upon completion of the currently executing flow period. Moreover, although the currently executing flow may be preferentially executed to the end in the present embodiment, for example, the currently executing flow period may be forcibly completed, the destination for reading the registered image data may be switched, and the next flow period may be started.

Furthermore, when the resetting is performed again (a second resetting is performed) after reflection of the reset contents in the normal operation, in step S6 of FIG. 8, upon completion of the resetting mode, new registered image data after editing which is stored in the third data storage area 310 is transmitted this time to the first data storage area 210 of the first processing section 200. Then, in step S7 of FIG. 8, the destination for reading the registered image data in the first processing section 200 is switched from the second data storage area 220 to the first data storage area 210.

As thus described, every time the user edits registered image data in the resetting mode to create new registered image data and reflects the new edited registered image data in the normal operation, the destination for reading the registered image data in the first processing section 200 is switched. It is thereby possible for the user to repeat, over any number of times, editing the registered image, performing a simulation by use of the edited registered image, and reflecting the edited registered image in the normal operation. Finally, when the user clicks a predetermined end button (not shown) on the monitor 40, the image processing device 1 completes the normal operation (step S8 of FIG. 8). As described above, the user can edit the registered image without stopping the normal operation, and can also edit parameter values with respect to the respective inspection items, a variable value of a variable uniquely defined by the user, and the like. This is described in detail hereinafter.

[Editing of Parameter Value]

Figure 20:
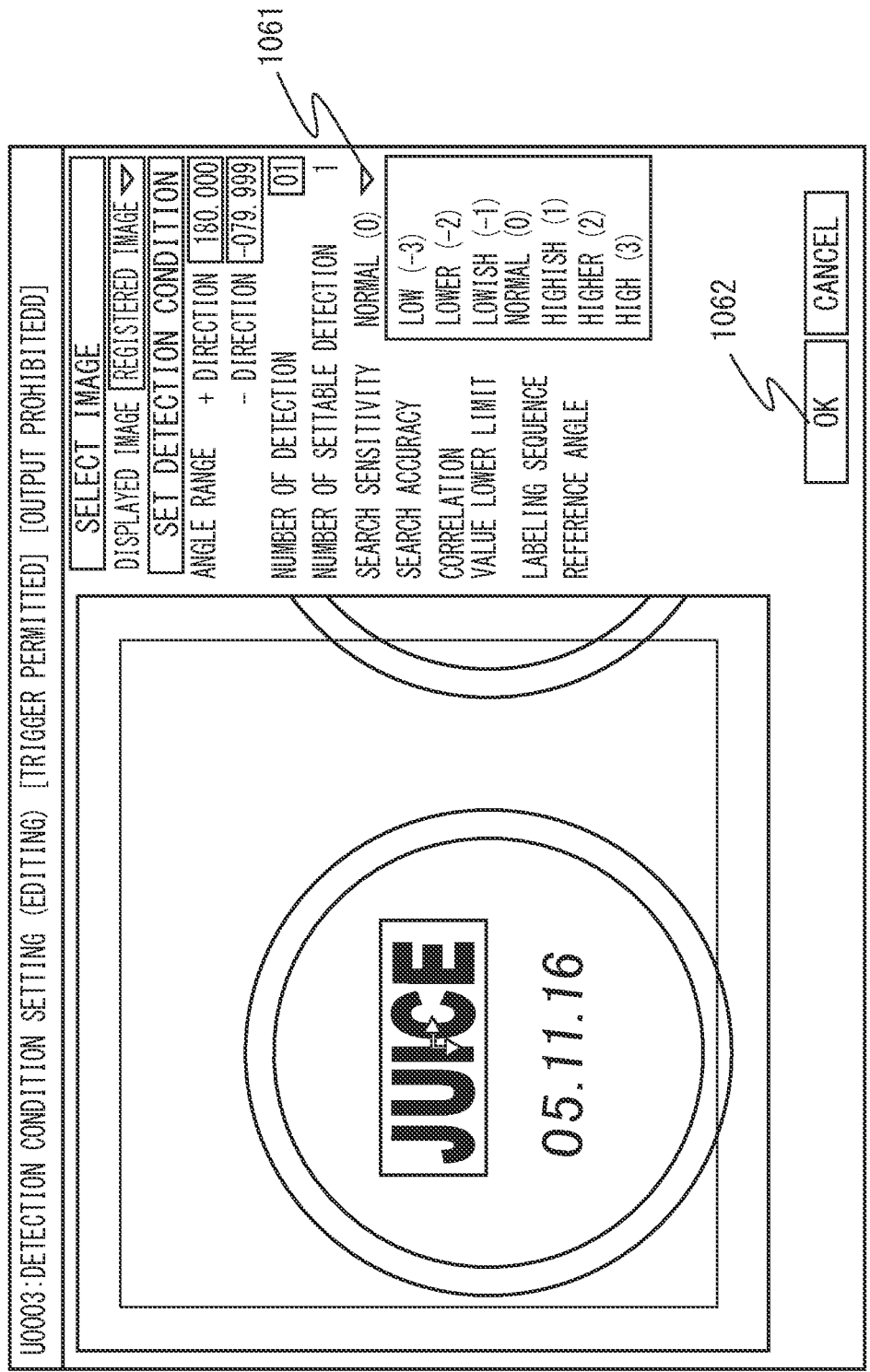
FIG. 20 is an example of a display screen of the monitor when a parameter value is being edited.

FIG. 20 shows an example of a displayed image of the monitor 40 when parameter values are being edited. A display screen shown in FIG. 20 is displayed when the user puts the cursor on the detection condition 1021 and clicks it with use of the console 50 on the display screen shown in FIG. 12.

As shown in FIG. 20, as detecting conditions for a pattern searching unit, an angle range (plus direction and minus direction), the number of detection, the number of settable detection, search sensitivity 1061, search accuracy, and the like can be set. The angle range is a parameter designating a range of an angle to be measured in the case where a specific pattern (registered image) in the inputted image is rotating. The number of detection is a parameter designating the maximal number of specific patterns that are detected in pattern searching measurement. The number of settable detection is a parameter designating the number of settable detection. The search sensitivity 1061 is a parameter designating a search sensitivity that adjusts priorities between the detection stability and the processing time. The search accuracy is a parameter designating search accuracy that adjusts priorities between the detection accuracy and the processing time. In FIG. 20, there is shown a state where the cursor is put on the search sensitivity 1061 and clicked, and as a pull-down menu, seven-level parameter values: low, lower, lowish, normal, highish, higher, high, are displayed. The user can edit the parameter value by selecting a desired parameter value and clicking an OK button 1062.

When the parameter value is edited by clicking the OK button 1062, the control section 100 copies the parameter value after editing into the memory 13. This is because the normal operation is continued even during editing of the parameter value, and hence the parameter value is required for a simulation separately from the normal operation. For example in FIG. 20, in the case where the parameter value of the search sensitivity 1061 in the normal operation is "normal", when the parameter value of the search sensitivity 1061 is edited to be "highish", the CPU 11 of the control section 100 copies the parameter value "highish" into the memory 13.

Subsequently, at the time of performing the simulation, when making the second processing section 300 execute pattern searching, the control section 100 transmits thereto the parameter value "highish" along with a command instructing that pattern searching be executed. Meanwhile, when making the first processing section 200 execute pattern searching, the control section 100 transmits thereto the parameter value "normal" along with a command instructing that pattern searching be executed.

In this manner, the control section 100 copies only the parameter value edited by the user into the memory 13, and transmits the copied parameter value to the second processing section 300 when the parameter value is required for the simulation. When the parameter value is appropriate as a result of the simulation, the user clicks the save button 1011 and the quit button 1012 (cf. FIG. 11) to complete the resetting mode, so as to make the resetting reflected (cf. step S7 of FIG. 8). Specifically, in the timing after completion of the currently executing flow period and immediately before starting of the next flow period, the control section 100 transmits the copied parameter value "highish". As thus described, since only a required parameter value may be copied into the memory 13, it is possible to efficiently use the memory resources, and also to edit the parameter value without stopping the normal operation. In addition, the parameter value "normal" as an original of the copy can be abandoned with reflection of the resetting.

[Editing of Variable Value]

FIG. 21 shows an example of a display screen of the monitor 40 when a variable value of a variable defined by the user is being edited. The display screen shown in FIG. 21 is displayed when the user puts the cursor on the variable setting 1031 and clicks it with use of the console 50 on the display screen shown in FIG. 11.

Herein, in the image processing device 1, there are three variables definable by the user, which are a local variable, a global variable and an image variable. The "local variable" is a variable which temporarily stores a number, a letter, or the like, and is a variable which is referenceable inside one inspection setting, as well as a variable which is referenceable in one processing sequence (flowchart) of the image processing unit. The local variable is initialized with an initial value previously defined by the user at power activation, or switching of the inspection setting, of the controller 10. Moreover, after temporary storage of an execution result for a specific image processing unit (e.g. edge position, etc.), the local variable is referenceable in execution of an image processing unit arranged below the specific image processing unit (e.g. distance between edge positions, etc). The "global variable" is a variable which temporarily stores a number, a letter, or the like, and which is also referenceable over a plurality of inspection settings (common to all inspection settings). That is, when there are a plurality of processing sequences (flowcharts) of image processing units, the global variable is a variable which is referenceable in common to the plurality of processing sequences. The "image variable" is a variable as described above.

Further, the local variable, the global variable and the image variable are stored in the memory 13 of the control section 100 in the present embodiment. Therefore, the memory 13 functions as an example of a variable value storing area for storing a variable value of a variable referenceable in a processing sequence program.

FIG. 21 shows an example of a display screen at the time of editing the local variable, and as variables of a scalar quantity, #L0000, #L0001, #a, #b and the like are defined. The user can put the cursor on the variable wished to be edited among these variables and click it, to change the variable value. Upon completion of editing the variable value, the user clicks a close button 1071, to complete editing of the variable value. At this time, the variable value after editing is stored by the CPU 11 of the control section 100 into the memory 13 in order to perform a simulation in the first processing section 200.

Herein, as shown in FIG. 21, there exist not only a variable definable and changeable by the user on his or her will, but also a variable such as a count-up variable indicating the number of execution of the flow executed (how many periods of execution are performed). This count-up variable is a variable that the user is not allowed to arbitrarily change for the reason that the normal operation is being continued in the first processing section 200.

Therefore, in the present embodiment, a flag indicating whether or not the user has made a change with use of the console 50 is made to correspond to each variable shown in FIG. 21 (a flag storage area has been provided in the memory 13), the CPU 11 of the control section 100 determines whether or not the variable is one changed by the user's will based upon whether or not this flag stands. At the time of transmitting a variable value of a variable to the first processing section 200, the CPU 11 of the control section 100 transmits to the first processing section 200 only a variable value of a variable changed by the user with use of the console 50, along with a command instructing image processing to be executed. In this manner, it is possible to prevent a variable that the user is not allowed to arbitrarily change (count-up variable, etc.) from being changed, while reflecting only the value changed by the user's will in the normal operation, so as to prevent an error on the system and also edit the parameter value without stopping the normal operation.

Modified Example

FIGS. 22 to 26 are block diagrams for describing the controller 10 of the image processing device 1 according to other embodiments of the present invention.

Figure 22:
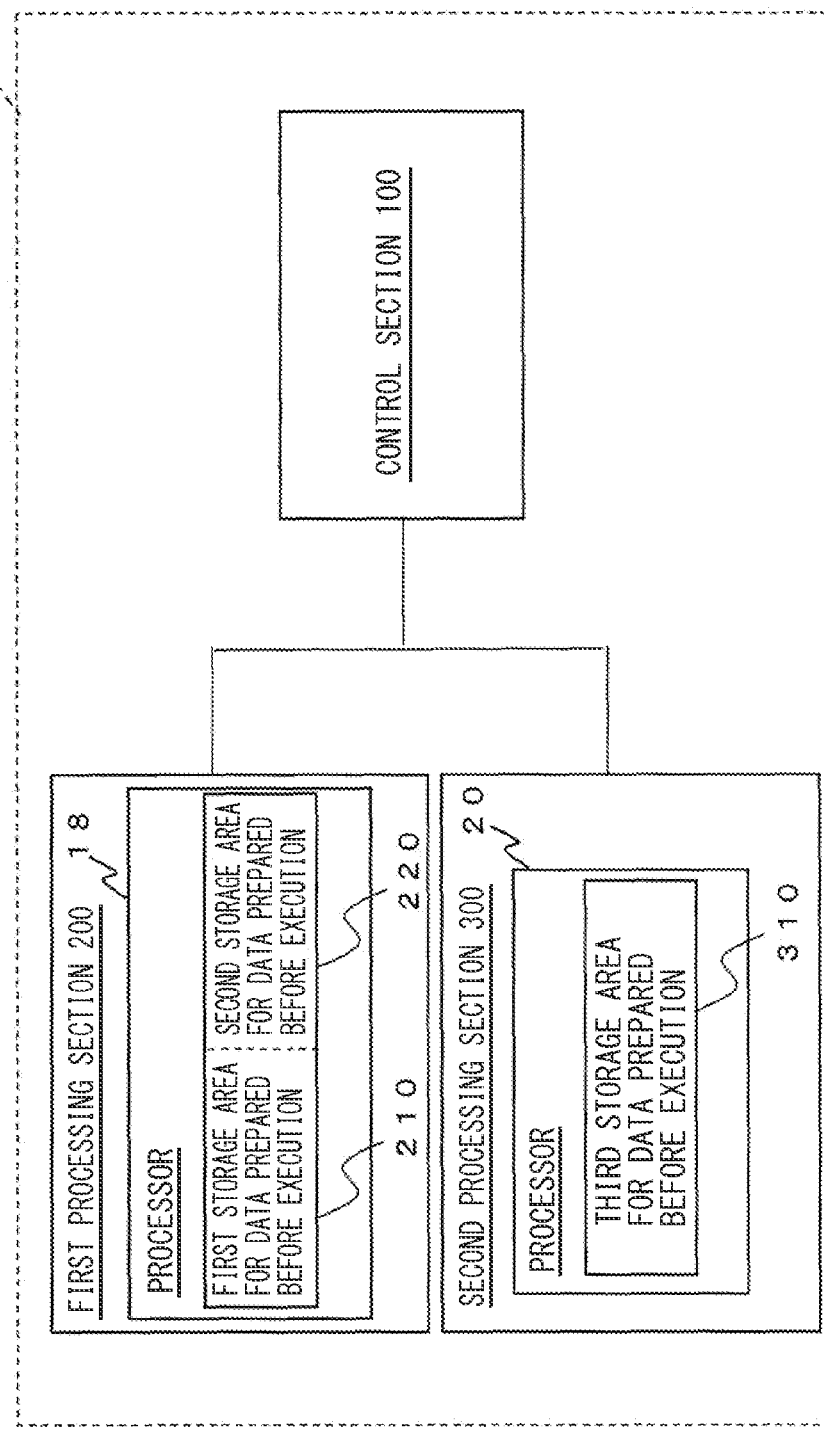
FIG. 22 is a block diagram for describing a controller of an image processing device according to another embodiment of the present invention.

In the present embodiment, as shown in FIG. 22, the first data storage area 210 and the second data storage area 220 can also be built inside the processor 18. That is, the processor 18 and the memory 19 shown in FIG. 2 can also be formed into one chip. However, with one-chip processor being high-priced, the hardware configuration shown in FIG. 2 can be adopted, so as to use the processor 18 and the memory 19 which are low-priced.

Figure 23:
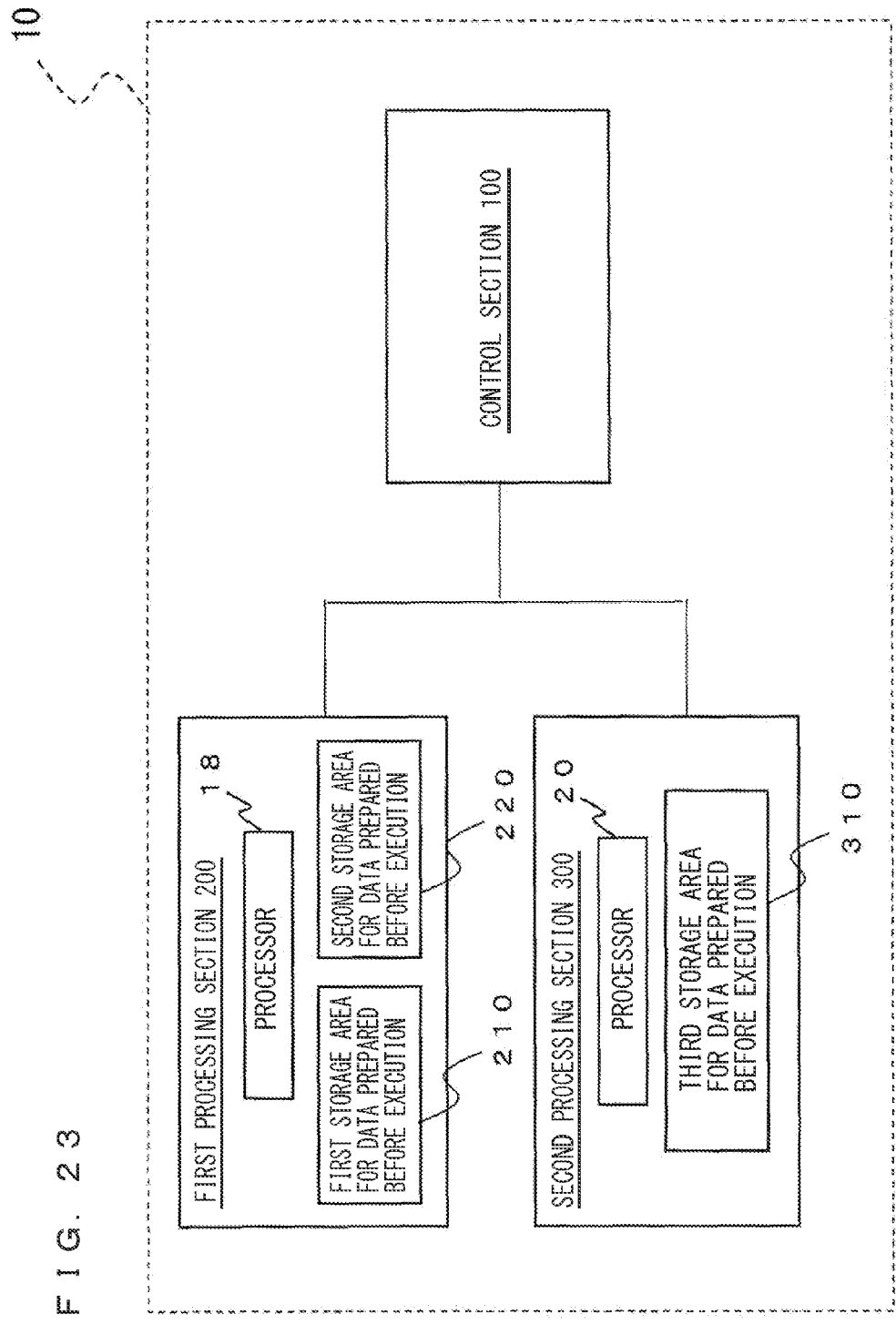
FIG. 23 is a block diagram for describing a controller of an image processing device according to another embodiment of the present invention.

Further, in the present embodiment, as shown in FIG. 23, the first data storage area 210 and the second data storage area 220 can also be separate, independent two memories. However, since the use of the two memories leads to an increased number of parts of the same kind, the hardware configuration shown in FIG. 2 can be adopted, to reduce the number of parts of the same kind so as to suppress the production cost.

Figure 24:
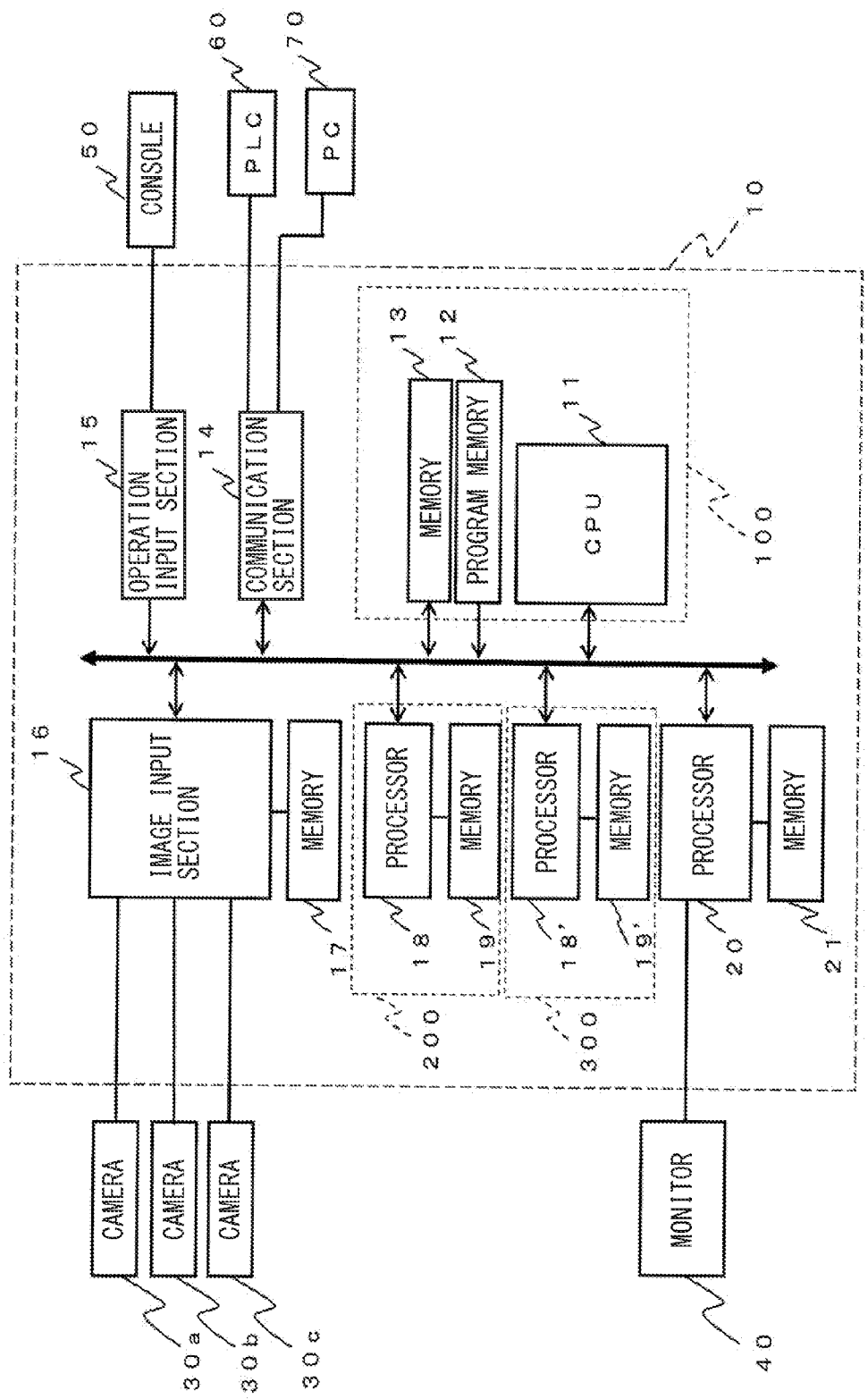
FIG. 24 is a block diagram for describing a controller of an image processing device according to another embodiment of the present invention.

Moreover, in the present embodiment, as shown in FIG. 24, the first processing section 200 and the second processing section 300 may be separately provided from the processor 20 and the memory 21. However, similarly to the above, since the use of the two memories leads to an increased number of parts of the same kind, the hardware configuration shown in FIG. 2 can be adopted, to reduce the number of parts of the same kind so as to suppress the production cost.

Additionally, the processor 20 in the second processing section 300 shown in FIG. 2 is also connected to the monitor 40, and also functions as a display control section for controlling contents of display of the monitor 40. Therefore, based upon a display control signal from the processor 20, processing results of the first processing section 200 and the second processing section 300 are made to be displayed on the monitor 40, while contents of an operation by the user with use of the console 50 are also made to be displayed on the monitor 40, whereby it is possible to switch at a high speed between the processing result (measurement result of the normal operation) of the first processing section 200 and the processing result (processing result of the simulation) of the second processing section 300 based upon the operation by the user.

Further, since the processor 18 for normal operation has to perform image processing at an extremely high speed in units of several tens of milliseconds, a high-priced, high-performance processor needs to be used, whereas the processor 20 for display may perform display control on the monitor 40 in units of several hundreds of milliseconds (or may switch displays at a speed to the extent that the user can visually check screen transition). Therefore, in the image processing device 1 (cf. FIG. 2) according to the present embodiment, the function as the second processing section 300 for performing a simulation is intentionally provided to the processor 20 for display and the memory 21. Thereby, it is possible to perform a simulation behind the normal operation while hardly decreasing the processing ability of the processor 18 for normal operation.

Moreover, when the processor is used both as the processor for simulation and the processor for display, a usage restriction is imposed upon the memory 21 for display, such as a video RAM. However, in the image processing device 1 (cf. FIG. 2) according to the present embodiment, a simulation can be performed so long as an area capable of storing registered image data wished to be edited by the user can be ensured, thereby preventing this usage restriction from having a harmful effect. Specifically, for example when the memory 21 is capable of storing one registered image data, the user creates new registered image data in the memory 21, performs a simulation while reading image data for testing from the memory 17, and transmits the new registered image data to the first processing section 200 when the data is appropriate. Next, the user again creates new registered image data into the memory 21, performs a simulation, and transmits the new registered image data to the first processing section 200 when the data is appropriate. Hereinafter, in the same manner as above, by performing repetitions of creating new registered image data and transmitting the data to the first processing section 200 for a required number of times, a plurality of registered images can be edited even when a usage restriction has been imposed upon the memory 21. It is to be noted that upon completion of editing all registered images, the destination for reading the registered image data may be switched, as described with reference to FIG. 7.

Figure 25:
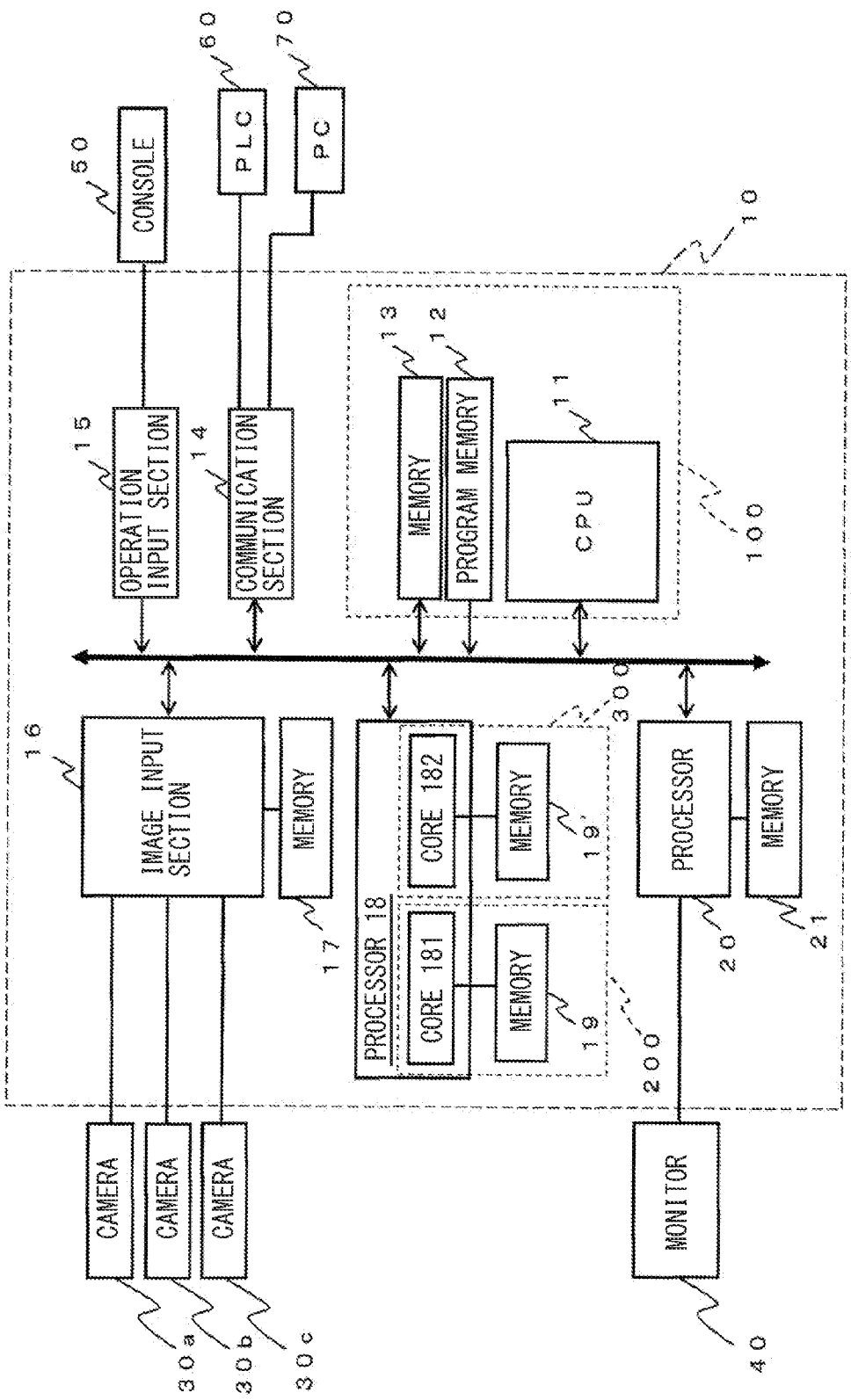
FIG. 25 is a block diagram for describing a controller of an image processing device according to another embodiment of the present invention.
Figure 26:
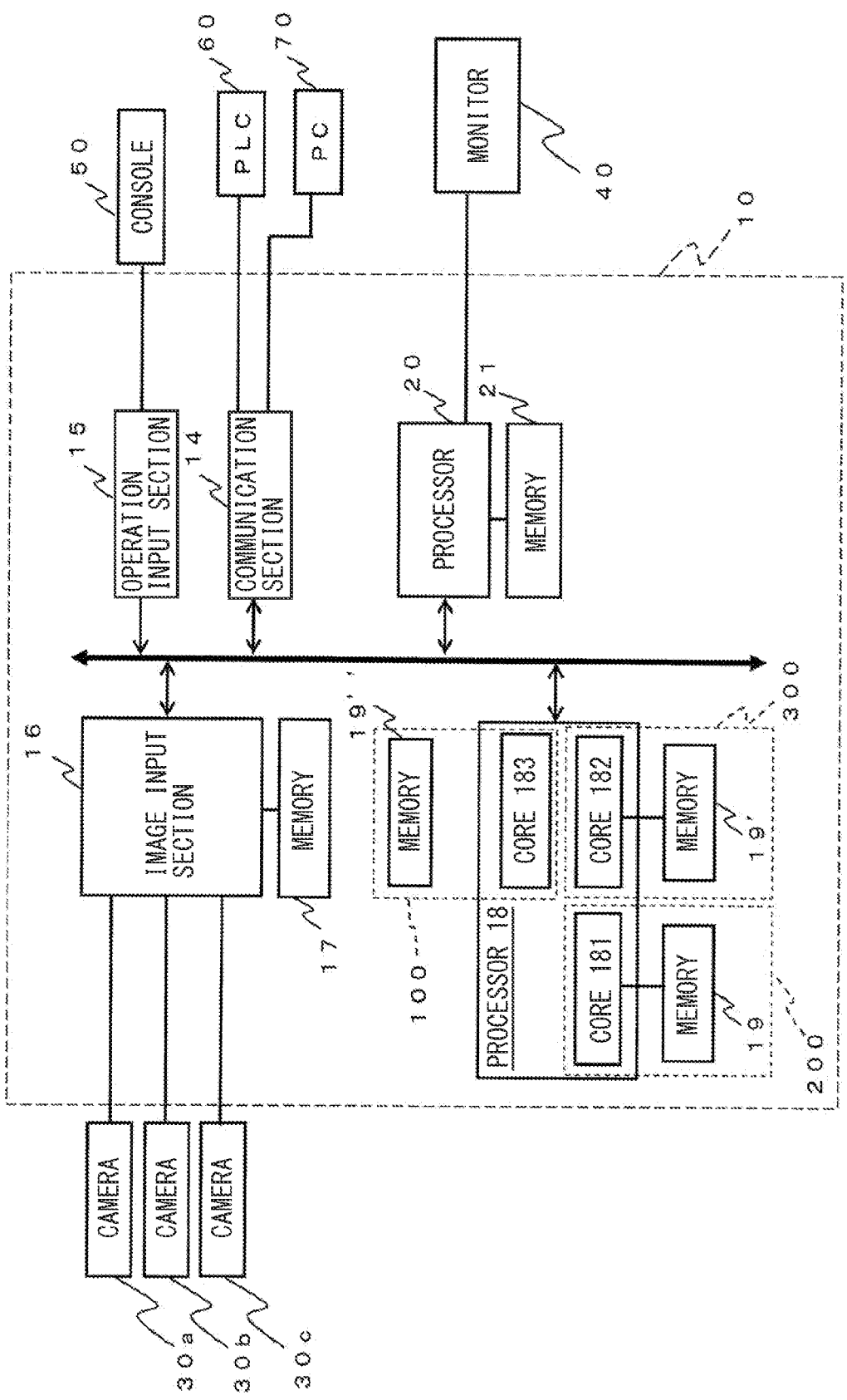
FIG. 26 is a block diagram for describing a controller of an image processing device according to another embodiment of the present invention.

Further, in the present embodiment, as shown in FIG. 25, using a dual-core processor as the processor 18, the function as the first processing section 200 can be provided to one core 181 and the memory 19 connected thereto, while the function as the second processing section 300 can also be provided to the other core 182 and a memory 19' connected thereto. It should be noted that as shown in FIG. 26, using a triple-core processor as the processor 18, the function of the CPU 11 of the control section 100 can also be provided to the processor 18.

What is claimed is:

1. An image processing device which has a camera that images an inspection target to produce image data, stores a processing sequence program defined with a processing sequence of a plurality of pieces of image processing, and sequentially executes the plurality of pieces of image processing by use of image data obtained from the camera based upon the processing sequence program, to determine whether the inspection target is acceptable or defective based upon a processing result and output a determination signal, the image processing device comprising:

a first processing section which has a first data storage area and a second data storage area for storing data for image processing that is used for at least one image processing among the plurality of pieces of image processing, and executes the plurality of pieces of image processing with the data for image processing stored in the first data storage area;

an operation input section, into which an operation signal based upon an operation by a user is inputted;

a second processing section which has a third data storage area for storing the data for image processing corresponding to the data for image processing stored in the first data storage area, edits the data for image processing stored in the third data storage area based on the operation signal that is inputted into the operation input section and simulates at least one image processing among the plurality of pieces of image processing with the edited data for image processing stored in the third data storage area in parallel with the plurality of pieces of image processing executed by the first processing section;

a control section which controls transmitting the edited data for image processing from the third data storage area to the second data storage area in parallel with the plurality of pieces of image processing executed by the first processing section with the data for image processing stored in the first data storage area, and controls the first processing section so as to execute the plurality of pieces of image processing with the edited data for image processing stored in the second data storage area.

2. The image processing device according to claim 1, wherein the control section has a fourth data storage area for storing the edited data for image processing read from the third data storage area, and when the edited data for image processing is to be reflected in image processing that is continuously executed in the first processing section, the control section reads the edited data for image processing from the third data storage area and stores the data into the fourth data storage area, while transmitting to the first processing section, a command instructing that the edited data for image processing be read from the fourth data storage area and stored into the second data storage area, and when image processing is executed by use of the edited data for image processing in the first processing section, the control section transmits a command instructing that the edited data for image processing be read from the second data storage area.

3. The image processing device according to claim 2, wherein the first processing section and the second processing section respectively have a first processor and a second processor, and when data for image processing edited by the second processor is to be reflected in image processing that is continuously executed by the first processor during continuous execution of the image processing by the first processor based upon the command from the control section, the control section reads the edited data for image processing from the third data storage area and stores the data into the fourth data storage area, while transmitting to the first processor a command instructing that an interruption be made during execution of image processing or between previous image processing and subsequent image processing, and the edited data for image processing be read from the fourth data storage area and stored into the second data storage area.

4. The image processing device according to claim 3, wherein
data for image processing edited by the second processor is image data, and
when reading the edited image data from the fourth data storage area, the control section transmits to the first processor a command instructing that the image data be divided into small units and sequentially stored into the second data storage area.

5. The image processing device according to claim 1, comprising
a display section which displays image processing results in the first processing section and the second processing section, wherein,
when image processing is being continuously executed in the first processing section, the second processing section transmits to the display section a control signal for displaying the image processing result in the first processing section based upon the command from the control section, and edits therein data for image processing stored into the third data storage area, and when image processing by use of the edited data for image processing is executed, the second processing section transmits to the display section a control signal for displaying the image processing result in the second processing section based upon the command from the control section.

6. The image processing device according to claim 1, comprising
a variable value storage area which stores a variable value of a variable referenceable in the processing sequence program, wherein,
when the variable value of the variable is changed based upon the operation signal, the control section stores the changed variable value into the variable value storage area, and
when transmitting the variable value of the variable to the first processing section along with the command instructing image processing to be executed, the control section transmits the changed variable value as for the variable with the variable value changed based upon the operation signal.

7. An image processing method, using an image processing device which has a camera that images an inspection target to produce image data, stores a processing sequence program defined with a processing sequence of a plurality of pieces of image processing, and sequentially executes the plurality of pieces of image processing by use of image data obtained from the camera based upon the processing sequence program, to determine quality of the inspection target based upon a processing result and output a determination signal, wherein
the image processing device includes
a first processing section which has a first data storage area and a second data storage area for storing data for image processing that is used for at least one image processing among the plurality of pieces of image processing, and executes the plurality of pieces of image processing with the data for image processing stored in the first data storage area,
a second processing section which has a third data storage area for storing the data for image processing corresponding to the data for image processing stored in the first data storage area, edits the data for image processing stored in the third data storage area based on the operation signal that is inputted into the operation input section and simulates at least one image processing among the plurality of pieces of image processing with the edited data for image processing stored in the third data storage area in parallel with the plurality of pieces of image processing executed by the first processing section,
a control section which controls transmitting the edited data for image processing from the third data storage area to the second data storage area in parallel with the plurality of pieces of image processing executed by the first processing section with the data for image processing stored in the first data storage area, and controls the first processing section so as to execute the plurality of pieces of image processing with the edited data for image processing stored in the second data storage area, and
an operation input section, into which an operation signal based upon an operation by a user is inputted, and
the method comprises:
a first step where, when image processing is executed by use of the data for image processing in the first processing section, the control section transmits to the first processing section a command instructing that the data for image processing be read from the first data storage area, as well as instructing that the plurality of pieces of image processing be continuously executed based upon the processing sequence program;
a second step where the control section transmits to the second processing section, based upon the operation signal, a command instructing that data for image processing stored into the third data storage area be edited;
a third step where the control section transmits to the second processing section, based upon the operation signal, a command instructing that image processing by use of the edited data for image processing be executed; and
a fourth step where, the control section transmits to the first processing section and the second processing section a command instructing that the edited data for image processing be transmitted from the third data storage area to the second data storage area and the edited data for image processing be read from the second data storage area when image processing is executed by use of the edited data for image processing in the first processing section.

* * * * *